(12) United States Patent
Peach

(10) Patent No.: US 9,015,567 B2
(45) Date of Patent: Apr. 21, 2015

(54) METHODS AND SYSTEMS FOR CONSISTENCY CHECKING AND ANOMALY DETECTION IN AUTOMATIC IDENTIFICATION SYSTEM SIGNAL DATA

(75) Inventor: Robert Peach, Cambridge (CA)

(73) Assignee: Com Dev International Ltd., Cambridge (CA)

( * ) Notice: Subject to any disclaimer, the term of this patent is extended or adjusted under 35 U.S.C. 154(b) by 458 days.

(21) Appl. No.: 13/445,552

(22) Filed: Apr. 12, 2012

(65) Prior Publication Data

US 2013/0275842 A1  Oct. 17, 2013

(51) Int. Cl.
| G06F 11/00 | (2006.01) |
| G08C 25/00 | (2006.01) |
| H03M 13/00 | (2006.01) |
| H04L 1/00 | (2006.01) |
| G06F 11/07 | (2006.01) |
| H04B 7/185 | (2006.01) |

(52) U.S. Cl.
CPC ........ *G06F 11/0751* (2013.01); *H04B 7/18513* (2013.01)

(58) Field of Classification Search
CPC .... H04B 7/18513; H04B 7/1851; G08G 3/02; G08G 3/00; G01S 7/003; G01S 13/9307; G01S 13/91; G01S 19/428; G01S 19/17; G01S 5/0027; G01S 19/14; G01S 1/68; G01S 19/13; G01S 19/42; G08B 31/00; G08B 21/12; B63B 22/24; B63B 2213/02; E02B 15/04
See application file for complete search history.

(56) References Cited

U.S. PATENT DOCUMENTS

| 3,307,188 A | 2/1967 | Marchetti et al. |
| 3,725,938 A | 4/1973 | Black |
| 3,825,928 A | 7/1974 | Williams |
| 3,842,417 A | 10/1974 | Williams |
| 4,023,170 A | 5/1977 | Buss |
| 4,028,699 A | 6/1977 | Stevens |
| 4,114,142 A | 9/1978 | Wycoff et al. |
| 4,129,873 A | 12/1978 | Kennedy |
| 4,276,551 A | 6/1981 | Williams et al. |
| 4,359,733 A | 11/1982 | O'Neill |
| 5,029,184 A | 7/1991 | Andren et al. |
| 5,103,461 A | 4/1992 | Tymes et al. |
| 5,132,694 A | 7/1992 | Sreenivas |
| 5,142,550 A | 8/1992 | Tymes et al. |

(Continued)

FOREIGN PATENT DOCUMENTS

| AU | 2008258219 B2 | 1/2013 |
| AU | 2013200747 A1 | 3/2013 |

(Continued)

OTHER PUBLICATIONS

Document relating to ZA Application No. 200908395, dated Apr. 24, 2013 (Certificate of Patent).

(Continued)

*Primary Examiner* — Guerrier Merant
(74) *Attorney, Agent, or Firm* — Bereskin & Parr LLP/S.E.N.C.R.L., s.r.l.

(57) ABSTRACT

Methods and systems for validating positions reported in AIS message signals by fitting suitably chosen functions to signal characteristic data, such as timing and Doppler shift data, derived from a plurality of AIS message signals. Ships whose reported positions deviate from the fitted function may be flagged as suspect.

24 Claims, 9 Drawing Sheets

(56) References Cited

U.S. PATENT DOCUMENTS

| | | | |
|---|---|---|---|
| 5,157,687 A | 10/1992 | Tymes et al. |
| 5,233,358 A | 8/1993 | Murphy |
| 5,280,498 A | 1/1994 | Tymes |
| 5,359,521 A | 10/1994 | Kyrtsos et al. |
| 5,375,059 A | 12/1994 | Kyrtsos et al. |
| 5,379,448 A | 1/1995 | Ames et al. |
| 5,390,125 A | 2/1995 | Sennott et al. |
| 5,401,944 A | 3/1995 | Bravman et al. |
| 5,420,809 A | 5/1995 | Read et al. |
| 5,438,517 A | 8/1995 | Sennott et al. |
| 5,442,558 A | 8/1995 | Kyrtsos et al. |
| 5,479,441 A | 12/1995 | Tymes |
| 5,490,073 A | 2/1996 | Kyrtsos |
| 5,506,587 A | 4/1996 | Lans |
| 5,528,221 A | 6/1996 | Jeuch Pierre et al. |
| 5,528,621 A | 6/1996 | Heiman et al. |
| 5,550,743 A | 8/1996 | Kyrtsos |
| 5,555,503 A | 9/1996 | Kyrtsos et al. |
| 5,579,016 A | 11/1996 | Wolcott et al. |
| 5,629,855 A | 5/1997 | Kyrtsos et al. |
| 5,668,803 A | 9/1997 | Tymes et al. |
| 5,706,313 A | 1/1998 | Blasiak et al. |
| 5,726,659 A * | 3/1998 | Kee et al. ............ 342/352 |
| 5,754,139 A | 5/1998 | Turcotte et al. |
| 5,815,811 A | 9/1998 | Pinard et al. |
| 6,002,918 A | 12/1999 | Heiman et al. |
| 6,011,512 A | 1/2000 | Cohen |
| 6,044,323 A | 3/2000 | Yee et al. |
| 6,104,978 A | 8/2000 | Harrison et al. |
| 6,148,040 A | 11/2000 | Nguyen et al. |
| 6,185,427 B1 | 2/2001 | Krasner et al. |
| 6,236,354 B1 | 5/2001 | Krasner |
| 6,298,242 B1 | 10/2001 | Schiff |
| 6,314,269 B1 | 11/2001 | Hart et al. |
| 6,370,126 B1 | 4/2002 | De Baere et al. |
| 6,374,104 B1 | 4/2002 | Croq et al. |
| 6,421,000 B1 | 7/2002 | McDowell |
| 6,427,121 B2 | 7/2002 | Brodie |
| 6,512,720 B1 | 1/2003 | Yang |
| 6,522,301 B2 | 2/2003 | Takayama et al. |
| 6,522,643 B1 | 2/2003 | Jacomb-Hood et al. |
| 6,536,354 B1 | 3/2003 | Madison et al. |
| 6,611,757 B2 | 8/2003 | Brodie |
| 6,658,349 B2 | 12/2003 | Cline |
| 6,738,358 B2 | 5/2004 | Bist et al. |
| 6,813,263 B1 | 11/2004 | Margherita |
| 6,823,170 B1 | 11/2004 | Dent |
| 7,047,114 B1 | 5/2006 | Rogers |
| 7,205,933 B1 | 4/2007 | Snodgrass |
| 7,265,713 B2 | 9/2007 | Lewis |
| 7,317,916 B1 | 1/2008 | Chang et al. |
| 7,526,249 B2 | 4/2009 | Waltman et al. |
| 7,594,260 B2 | 9/2009 | Porras et al. |
| 7,817,079 B1 * | 10/2010 | Funk ............ 342/41 |
| 7,876,865 B2 | 1/2011 | Peach |
| 8,295,325 B2 | 10/2012 | Guey |
| 8,374,292 B2 | 2/2013 | Peach |
| 8,780,788 B2 | 7/2014 | Peach |
| 2002/0061073 A1 | 5/2002 | Huang et al. |
| 2003/0017827 A1 | 1/2003 | Ciaburro et al. |
| 2004/0039504 A1 | 2/2004 | Coffee et al. |
| 2004/0166807 A1 | 8/2004 | Vesikivi et al. |
| 2004/0174895 A1 | 9/2004 | Hiraoka |
| 2004/0183673 A1 | 9/2004 | Nageli |
| 2004/0193367 A1 | 9/2004 | Cline |
| 2004/0217900 A1 | 11/2004 | Martin et al. |
| 2005/0060739 A1 | 3/2005 | Verna |
| 2005/0124291 A1 | 6/2005 | Hart et al. |
| 2005/0248486 A1 | 11/2005 | Lee et al. |
| 2005/0271000 A1 | 12/2005 | Schulist |
| 2006/0087456 A1 | 4/2006 | Luby |
| 2006/0107192 A1 | 5/2006 | Mantha et al. |
| 2006/0109106 A1 | 5/2006 | Braun |
| 2006/0114862 A1 | 6/2006 | Hiraoka |
| 2006/0129288 A1 | 6/2006 | Yanagi |
| 2006/0199612 A1 | 9/2006 | Beyer et al. |
| 2006/0205370 A1 | 9/2006 | Hayashi et al. |
| 2008/0086267 A1 | 4/2008 | Stolte et al. |
| 2008/0088485 A1 | 4/2008 | Stolte et al. |
| 2008/0220771 A1 | 9/2008 | Agarwal |
| 2008/0268775 A1 | 10/2008 | Bishop |
| 2008/0304597 A1 | 12/2008 | Peach et al. |
| 2009/0161797 A1 * | 6/2009 | Cowles et al. ............ 375/324 |
| 2009/0207020 A1 * | 8/2009 | Garnier et al. ............ 340/541 |
| 2010/0061427 A1 | 3/2010 | Lopez-Risueno et al. |
| 2010/0117903 A1 | 5/2010 | Zheng |
| 2011/0075602 A1 | 3/2011 | Peach et al. |
| 2011/0304502 A1 | 12/2011 | Chen et al. |

FOREIGN PATENT DOCUMENTS

| | | |
|---|---|---|
| CA | 2653203 A1 | 12/2007 |
| CA | 2687322 A1 | 12/2008 |
| CA | 2715155 A1 | 3/2011 |
| EP | 1202388 A2 | 5/2002 |
| EP | 2024754 A2 | 2/2009 |
| EP | 2211486 | 1/2013 |
| EP | 2302821 B1 | 6/2013 |
| EP | 2651046 B1 | 10/2013 |
| EP | 2156207 | 2/2014 |
| IN | 66DELNP2010 | 8/2010 |
| JP | 2003109200 A | 4/2003 |
| JP | 2005181078 | 7/2005 |
| WO | 0209318 A2 | 1/2002 |
| WO | 03/046603 A1 | 6/2003 |
| WO | 2004010572 A1 | 1/2004 |
| WO | 2007143478 A2 | 12/2007 |
| WO | 2008148188 A1 | 12/2008 |
| WO | 2013152427 A1 | 10/2013 |

OTHER PUBLICATIONS

Document relating to U.S. Appl. No. 12/915,699, dated Nov. 7, 2012 (Notice of Allowance and Examiner Interview Summary).

Document relating to MY Application No. 20095226, dated Jan. 15, 2014 (Office Action).

Document relating to EP Application No. 08748111.5, dated Jan. 16, 2014 (Decision to Grant).

Document relating to AU Application No. 2008258219, dated May 9, 2013 (Notice of Grant).

Document relating to ID Application No. IDP0030572, dated Mar. 30, 2012 (Certificate of Patent).

IPRP dated Dec. 11, 2009, in relation to PCT Application No. PCT/CA2008/000666.

Ole Frederick Haakonsen Dahl: "Space-based AIS receiver for maritime traffic monitoring using interference cancellation", Norwegian University of Science and Technology Master of Science in Communication Technology Jun. 2006, pp. 1-107, XP002581810 Retrieved from the Internet: URL:http://ntnu.diva-portal.org/smash/get/diva2:121772/FULLTEXT01>[retrieved on May 11, 2010] * pp. 49 to 52; Section 4.4.2. "Interference Cancellation Methods", "Directivity Nulling" *.

Supplementary Search Report in relation to European Application No. 08748111.5, dated May 21, 2010.

Examination Report in relation to European Application No. 08748111.5, dated Apr. 17, 2012.

Examination Report in relation to European Application No. 08748111.5, dated May 30, 2012.

Examination Report in relation to European Application No. 08748111.5, dated Jul. 27, 2012.

Response to Examination Report in relation to European Application No. 08748111.5 submitted on Aug. 24, 2012.

International Search Report dated Jul. 24, 2008 and Written Opinion dated Jul. 11, 2008 in relation to PCT Application No. PCT/CA2008/000666.

Examination Report in relation to European Application No. 10192812.5, dated Sep. 10, 2012.

Notice of Abandonment dated Feb. 8, 2012, U.S. Appl. No. 12/360,473.

Amendment dated Jul. 14, 2010, U.S. Appl. No. 11/760,358.

(56) References Cited

OTHER PUBLICATIONS

Notice of Allowance dated Oct. 1, 2010, U.S. Appl. No. 11/760,358.
Examiner Interview Summary dated Oct. 1, 2010, U.S. Appl. No. 11/760,358.
Office Action dated Apr. 14, 2010, U.S. Appl. No. 11/760,358.
"Coast Guard looks to space for maritime awareness", U.S. Coast Guard Press Release, Jan. 24, 2007.
Comments of the National Telecommunications and Information Administration before the Federal Communications Commission on Dec. 1, 2006.
FFI Facts—Space-based Surveillance, Apr. 2005.
Satellite AIS from USCG, Digital Ship, Apr. 2007, p. 26.
Cairns, "AIS and Long Range Identification & Tracking", Journal of Navigation, paper presented on Nov. 9, 2004, pp. 181-189, v. 58, Royal Institute of Navigation.
Maritime Safety and Surveillance Initiative presentation dated Apr. 2005.
Molessa, "Satellite AIS for Long Range Identification & Tracking", seminar dated Nov. 3-5, 2004.
ITU Radio Communication Study Groups Document 8B/242-E dated Sep. 9, 2005.
Tetrault, "Use of AIS for Maritime Domain Awareness", presentation dated Oct. 17, 2005.
Wahl et al., "New possible roles of small satellites in maritime surveillance", Acta Astronautica, 2004, pp. 273-277, v. 59, Elsevier.
Eriksen et al., "Maritime traffic monitoring using a space-based AIS receiver", paper presented at 55th International Astronautical Congress 2004, Vancouver, Canada.
Høye et al., "Space-based AIS for global maritime traffic monitoring", Acta Astronautica, available online Sep. 17, 2007, pp. 240-245, v. 62, Elsevier.
Meland et al., "Maritime services for large-area surveillance using a space-based AIS receiver", Feb. 21, 2005.
Cairns, "AIS and Long Range Identification & Tracking", abstract published online on Apr. 18, 2005.
Wahl et al., "New possible roles of small satellites in maritime surveillance", abstract available online Nov. 17, 2004.
Short Messaging System Application Concepts Study, dated Jun. 30, 2005.
Preliminary Amendment dated Oct. 30, 2007, U.S. Appl. No. 11/760,358.
Previously co-pending U.S. Appl. No. 11/760,358 entitled, "System and Method for Decoding Automatic Identification System Signals" filed Jun. 8, 2007, now issued as Patent No. 7,876,865.
Co-pending U.S. Appl. No. 12/915,699, entitled "System and Method for Decoding Automatic Identification System Signals" filed Oct. 29, 2010.
Office Action dated Apr. 10, 2012, U.S. Appl. No. 12/915,699.
Watching the watchers: satellite to demonstrate maritime surveillance for coast guard, Entrepreneur.com, Jan. 2008.
"AIS Satellites for Global Ship Tracking", gCaptain.com, dated Aug. 7, 2007.
Co-pending U.S. Appl. No. 12/567,104, entitled "Systems and Methods for Decoding Automatic Identification System Signals" filed Sep. 25, 2009.
Response dated Aug. 23, 2012, European Application No. 08748111.5.
Cervera, Miguel et al., "On the Performance Analysis of a Satellite-based AIS System", Signal Processing for Space Communications, 2008, SPSC 2008, 10th International Workshop on, IEEE, Piscataway, NJ, USA, Oct. 6, 2008, pp. 1-8.
Naoues, Malek et al., "Design of an RF-subsampling Based Tri-band AIS and DSC Radio Receiver", Cognitive Radio and Advanced Spectrum Management, 2009, Second International Workshop on, IEEE, Piscataway, NJ, USA, May 18, 2009, pp. 64-68.
Office Action dated Jul. 18, 2011, U.S. Appl. No. 12/360,473.
European Communication dated Dec. 19, 2011, European Application No. 10192812.5.
Response dated Jun. 13, 2012, European Application No. 10192812.5.
Amendment dated Mar. 1, 2010, European Application No. 08748111.5.
Response dated Oct. 8, 2010, European Application No. 08748111.5.
Office Action dated Apr. 17, 2012, European Application No. 08748111.5.
Office Action dated May 30, 2012, European Application No. 08748111.5.
EP Communication dated Jul. 27, 2012, European Application No. 08748111.5.
European Communication dated Apr. 11, 2012, European Application No. 10178715.8.
Extended European Search Report dated Mar. 5, 2012, European Application No. 10178715.8.
Høoye et al., "Space-based AIS for global maritime traffic monitoring", pre-print from 5th IAA Symposium on Small Satellites for Earth Observation, Apr. 4-8, 2005, Berlin.
Smart Radio Holdings SR162 Professional AIS Receiver http://diytrade.com/china/4/products/254509/SR162_PROFESSIONAL_AIS_RECEIVER.html Oct. 2002.
Response dated Oct. 1, 2010, European Application No. 09250993.4.
Response dated Aug. 23, 2011, European Application No. 09250993.4.
Summons to Attend Oral Proceedings dated Mar. 13, 2012, European Application No. 09250993.4.
Written Submissions dated Jun. 1, 2012, European Application No. 09250993.4.
Written Submissions dated Jun. 13, 2012, European Application No. 09250993.4.
Examiner's Result of Consultation dated Jun. 27, 2012, European Application No. 09250993.4.
Notice of Intent to Grant dated Jul. 25, 2012, European Application No. 09250993.4.
Office Action dated Apr. 4, 2012, Australian Application No. 2008258219.
European Communication dated Aug. 2, 2010, European Application No. 09250993.4.
Office Action in relation to U.S. Appl. No. 12/797,066 mailed May 30, 2012.
Office Action dated Apr. 1, 2011, Australian Application No. 2008258219.
Office Action dated Dec. 29, 2011, Indonesian Application No. W00200903348.
Amendment in relation to U.S. Appl. No. 12/797,066 dated Aug. 30, 2012.
Wikipedia Article, "Analog-to-Digital Converter", Jun. 7, 2009 version.
European Examination Report dated Mar. 8, 2011 and the European Search Report along with the Written Opinion dated Aug. 12, 2009 and for Application No. 09250993.4-2411.
Supplemental Search Report dated May 26, 2010 for Application No. 08748111.5-2411/2156207.
Euronav Navigation AI3000 AIS http://www.euronav.ca.uk/Products/Hardware/AIS_receivers/AIS3000/AIS3000AIS_RX.htm Sep. 2009.
Extended European Search Report for Application No. EP10192812 dated Apr. 11, 2011.
Amendment in relation to U.S. Appl. No. 12/915,699 dated Jul. 9, 2012.
Co-pending U.S. Appl. No. 12/797,066 entitled "Systems and Methods for Segmenting a Satellite Field of View for Detecting Radio Frequency Signals" filed Jun. 9, 2010.
Co-pending U.S. Appl. No. 12/360,473 entitled, "Satellite Detection of Automatic Identification System Signals" filed Jan. 27, 2009.
Document relating to EP Application No. EP Application No. 08748111.5-1852, dated Aug. 19, 2013 (Intention to Grant) .
Document relating to PCT Application No. PCT/CA2013/000341, dated Jul. 17, 2013 (International Search Report & Written Opinion).
Document relating to International Application No. PCT/CA2013/000341, dated Oct. 14, 2014 (IPRP).
J. Ward et al., High throughput slotted ALOHA packet radio networks with adaptive arrays, IEEE Tansactions on Communications, vol. 41(3), p. 460-470, 1993.

(56) References Cited

OTHER PUBLICATIONS

P. Lehne et al., An Overview of Smart Antenna Technology for Mobile Communication Systems, IEEE Communications Surveys, vol. 2(4), p. 2-13, 1999.
A. Jacobsen, Smart Antennas for Dummies, Telenor R&D Report, Jan. 2001.
Document relating to CA Application No. 2687322, dated Feb. 26, 2014 (Office Action).
Document relating to CA Application No. 2687322, dated Oct. 2, 2014 (Notice of Allowance).
Document relating to MY Application No. PI 20095226, dated Jun. 30, 2014 (Certificate of Grant).
Document relating to ID Application No. IDP00034968, dated Nov. 11, 2013 (Patent Certificate).
Document relating to AU Application No. 2013200747, dated Sep. 9, 2014 (Office Action).
Document relating to U.S. Appl. No. 12/567,104 (Prosecution Docs).
Document relating to U.S. Appl. No. 12/797,066, dated Oct. 5, 2012 (Office Action).
Document relating to U.S. Appl. No. 12/797,066, dated Dec. 5, 2012 (Office Action Response).
Document relating to U.S. Appl. No. 12/797,066, dated Dec. 12, 2012 (Advisory Action).
Document relating to U.S. Appl. No. 12/797,066, dated Jan. 2, 2013 (Response and RCE).
Document relating to U.S. Appl. No. 12/797,066, dated Feb. 19, 2014 (Office Action).
Document relating to U.S. Appl. No. 12/797,066, dated May 14, 2014 (Office Action Response).
Document relating to U.S. Appl. No. 12/797,066, dated Jul. 14, 2014 (Office Action).
Document relating to U.S. Appl. No. 12/797,066, dated Aug. 22, 2014 (Interview Summary).
Document relating to U.S. Appl. No. 12/797,066, dated Sep. 12, 2014 (Office Action Response).
Document relating to U.S. Appl. No. 12/797,066, dated Sep. 17, 2014 (Advisory Action).
Document relating to U.S. Appl. No. 12/797,066, dated Oct. 10, 2014 (Response and RCE).

* cited by examiner

METHODS AND SYSTEMS FOR CONSISTENCY CHECKING AND ANOMALY DETECTION IN AUTOMATIC IDENTIFICATION SYSTEM SIGNAL DATA

FIELD

Embodiments described herein relate to systems and methods for processing Automatic Identification System signals. More particularly, embodiments described herein relate to systems and methods for detecting anomalous Automatic Identification System (AIS) messages.

BACKGROUND

The Automatic Identification System (AIS) is a maritime communications system designed for short-range (typically 20-30 nautical miles) ship-to-ship and ship-to-shore communications. The AIS system uses narrowband (i.e. 25 kHz Bandwidth) Very High Frequency (VHF) channels centered at 161.975 MHz and 162.025 MHz, with a possible additional channel at 157.375 MHz, and a communication method called Self-Organizing Time Division Multiple Access (SOT-DMA). The AIS system is specified in ITU document ITU-R M.1371-2, "Technical characteristics for a universal shipborne automatic identification system using time division multiple access in the VHF maritime mobile band", ITU 1998-2006, the entire contents of which is hereby incorporated by reference.

The AIS system supports a number of different types of signal. The principal AIS signal sent by a ship is a position report that provides information pertaining to the ship's identification, location, course, speed, and other details. The AIS also includes the use of a receiver, enabling a ship to receive AIS signals emitted by ships around it. Each minute, each VHF channel is divided into 2,250 time slots, each of which can accommodate one 26.67 ms AIS transmission (i.e. AIS signal). The time slots are accurately synchronized to Coordinated Universal Time (UTC) typically using Global Positioning System (GPS), and each AIS unit reserves time slots for future AIS transmissions from the ship. Other AIS units within range can therefore maintain a map of reserved slots and avoid transmitting during these intervals. This self-organizing feature avoids signal collisions over the short ranges involved in surface transmissions.

The use of AIS is now mandatory on all ships over 300 tons engaged on international voyages, and it is also being extended to other vessels. It was originally conceived as an aid to navigation and safety, and also has potential security applications for monitoring maritime traffic.

SUMMARY

In a first aspect, there is provided a method for detecting anomalous Automatic Identification System (AIS) message signals in a plurality of AIS message signals received by at least one satellite in space, the method comprising: identifying a plurality of message characteristics associated with the plurality of AIS message signals; computing one or more group characterization criteria for the plurality of AIS message signals based on the plurality of message characteristics; and computing a computed message characteristic for a selected message signal based on the one or more group characterization criteria; detecting whether an actual message characteristic associated with the selected message signal conforms to the computed message characteristic within a predetermined tolerance.

The method may further comprise: identifying a plurality of AIS message signals from a selected AIS transmitter in the plurality of AIS message signals; determining at least one transmitter characteristic based on the plurality of AIS message signals from the selected AIS transmitter; and using this transmitter characteristic to refine the estimates of other message characteristics associated with that particular transmitter.

In another broad aspect, there is provided an apparatus for detecting anomalous Automatic Identification System (AIS) message signals in a plurality of AIS message signals received by at least one satellite in space, the apparatus comprising: a memory, the memory storing the plurality of AIS message signals; a processor, the processor configured to: identify a plurality of message characteristics associated with the plurality of AIS message signals; compute one or more group characterization criteria for the plurality of AIS message signals based on the plurality of message characteristics; and compute a computed message characteristic for a selected message signal based on the one or more group characterization criteria; detect whether an actual message characteristic associated with the selected message signal conforms to the computed message characteristic within a predetermined tolerance.

The processor may be further configured to: identify a plurality of AIS message signals from a selected AIS transmitter in the plurality of AIS message signals; determine at least one transmitter characteristic based on the plurality of AIS message signals from the selected AIS transmitter; and use this transmitter characteristic to refine the estimates of other message characteristics associated with that particular transmitter.

In some cases, the selected message signal is in the plurality of AIS message signals.

In some cases, the one or more group characterization criteria comprise a computational function. In some cases, computing the one or more group characterization criteria comprises fitting the computational function to the plurality of message characteristics.

In some cases, the computational function comprises a linear combination of spherical harmonics.

In some cases, the at least one transmitter characteristic comprises a transmitter timing offset and/or a frequency offset.

In some cases, the computed message characteristic comprises Doppler shift, propagation delay, and/or a position of the AIS transmitter. The computed message characteristic may also comprise at least one characteristic selecting from the group consisting of: amplitude of the message signal and polarization of the message signal.

BRIEF DESCRIPTION OF THE DRAWINGS

A preferred embodiment of the present invention will now be described in detail with reference to the drawings, in which.

DESCRIPTION OF EXEMPLARY EMBODIMENTS

Figure 1:
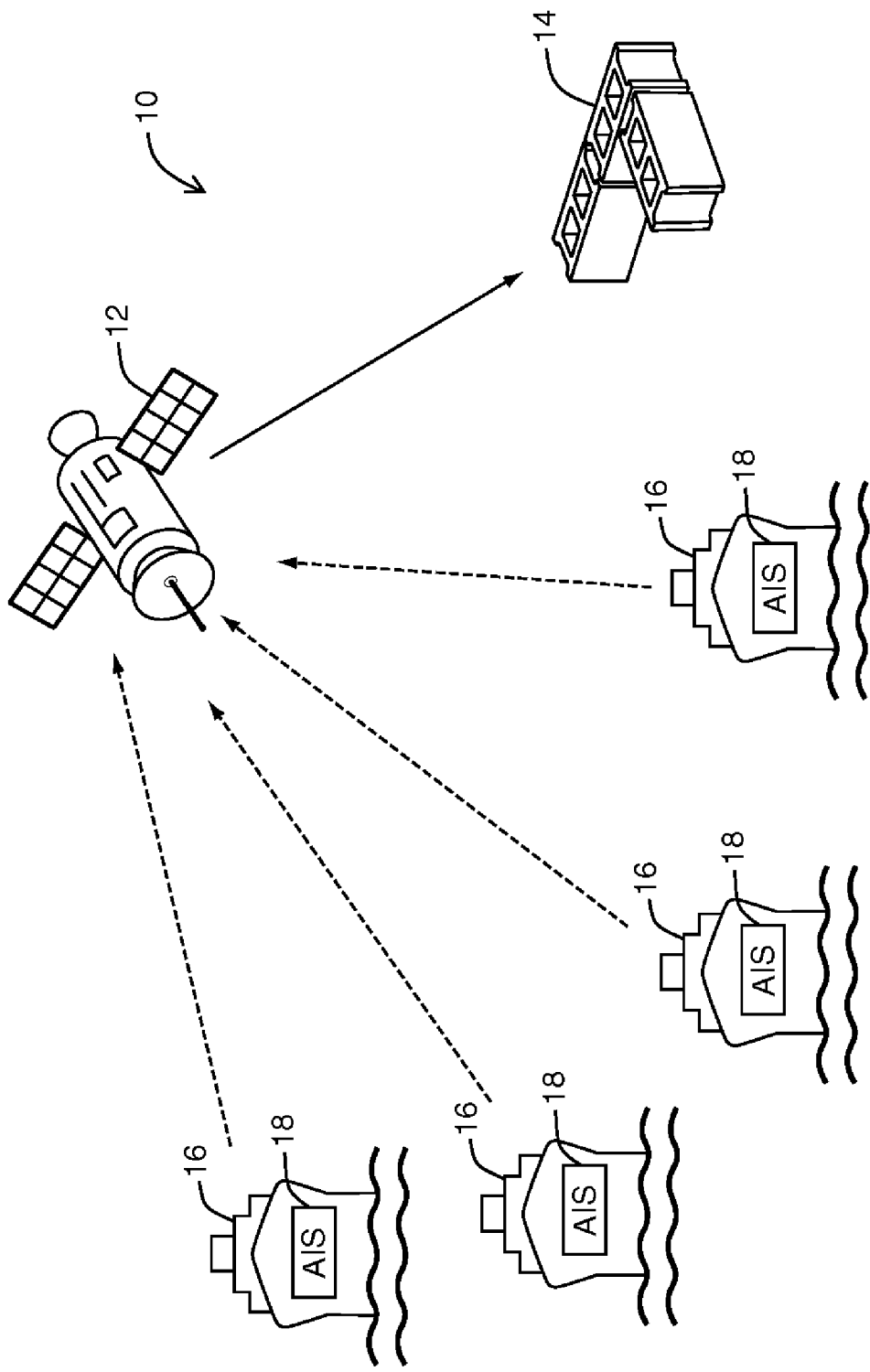
FIG. 1 is a general schematic diagram of an AIS processing system including a LEO satellite and a ground station.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail since these are known to those skilled in the art. Furthermore, it should be noted that this description is not intended to limit the scope of the embodiments described herein, but rather as merely describing one or more exemplary implementations.

AIS signals are strong enough to be detected by a satellite. Satellites, and low earth orbiting (LEO) satellites in particular, may also provide coverage for areas that are out of range of coastal/ground stations. However, the large field of view (FOV) of a LEO satellite means that the LEO satellite may receive signals from large numbers of ships at once, particularly as the LEO satellite passes over high volume shipping areas, which typically results in a large number of AIS signals colliding or overlapping with one another. Furthermore, the large FOV of a LEO satellite means that ships in the FOV may be very far from each other and at great distances the SOTDMA communication method may not be effective at avoiding signal collisions. Propagation delays may also affect accurate time synchronization.

Therefore, one problem encountered in LEO satellite based AIS detection is that many of the AIS signals sent by ships will collide or overlap with one another. For example, it is estimated that there may be 2,000 ships in the FOV of a LEO satellite in high traffic areas. Each ship will typically send 10 AIS position reports per minute so for 2,000 ships a LEO satellite will receive 20,000 AIS signals per minute. This is a very large number compared to the number of available time slots (i.e. 4,500 across both VHF channels) and as a result many AIS signals will collide with one another. Therefore, although the detection of AIS signals by a LEO satellite can provide a means for monitoring a large region of shipping traffic, the viability of this approach is largely dependent on being able to decode AIS signals in the presence of a large number of overlapping signals. Approaches for successful detection of AIS signals received in space are described in more detail in U.S. Pat. No. 7,876,865, the entire contents of which are incorporated by reference herein.

Reference is first made to FIG. 1, which shows a general diagram of an AIS processing system 10 including at least one LEO satellite 12 and a ground station 14 for receiving and decoding AIS signals. As shown, FIG. 1 illustrates numerous ships 16 that have an AIS transmitter device 18 for transmitting AIS signals that are received by the LEO satellite 12. For the purposes of illustration, only one satellite 12 is shown, but a plurality of satellites may be provided for receiving AIS signals.

Typically, a given ship 16 will transmit AIS signals over two narrowband (i.e. 25 kHz) VHF channels. Examples of AIS VHF channels include AIS1 at 161.975 MHz, AIS2 at 162.025 MHz, and USAIS at 157.375 MHz. To transmit the signal, the transmitting unit of the AIS transmitter device 18 employs a 9.6 kbps Gaussian minimum shift keying (GMSK) modulation, which is commonly known to imply that the AIS signal will be contained within a 14 kHz bandwidth. The LEO satellite 12 is equipped with at least one VHF antenna (see FIGS. 2 and 3) and receives the AIS signal transmitted by the ship 16. The LEO satellite 12 travels at a high velocity, such as 7,500 m/s for example, and consequently the AIS signal received by the LEO satellite 12 undergoes a Doppler shift of up to +/−3.5 kHz.

The AIS signals received by the LEO satellite 12 will have a range of amplitudes, depending on the location of the ship 16 and its angular position as seen by the LEO satellite 12. Generally, the transmitting antenna used in the AIS transmitter device 18 of a given ship 16 does not radiate directly upwards, and this may create a reception hole directly underneath the LEO satellite 12. However, for most of the FOV of the LEO satellite 12, the radiation patterns of the transmitting antenna of the AIS transmitter device 18 tend to balance the reduced signal strength caused by increased range, and the range of received signal amplitudes is relatively modest, and is most likely less than 10 dB for most of the FOV of the LEO satellite 12.

Received AIS signals may be pre-processed at the LEO satellite 12 to create digital input data, which is subsequently processed by a processing unit so that detected AIS signals can be decoded to extract the message segment contained therein. In some embodiments, the digital input data is downlinked from the LEO satellite 12 to the ground station 14 where processing occurs to produce the extracted message segments, as will be explained with reference to FIG. 2.

As noted, there may be more than one LEO satellite 12 that receives and pre-processes, as well as possibly detects and decodes, the AIS signals. In addition, or alternatively, one or more ground stations 14 may be used to decode the pre-processed AIS signals. In another alternative, the processing required for detection and decoding can be separated between the LEO satellite 12 and the ground station 14 in a variety of ways, with some or all of the processing being performed on the satellite, and the remainder of the processing being performed on the ground; this scheme can also be extended to the cases in which there is more than one LEO satellite 12 and one ground station 14, one LEO satellite 12 and more than one ground station 14, or more than one LEO satellite 12 and more than one ground station 14. Accordingly, in these cases, data can be transmitted between the LEO satellite(s) and ground station(s) for processing in a variety of fashions. For simplicity, the embodiments described herein are with regards to a system with one LEO satellite 12 and one ground station 14, but the processing methodology can be extended to several LEO satellites and/or several ground stations. It is also conceivable that inter-satellite links (ISL) amongst a constellation of LEO satellites could be employed.

Figure 2:
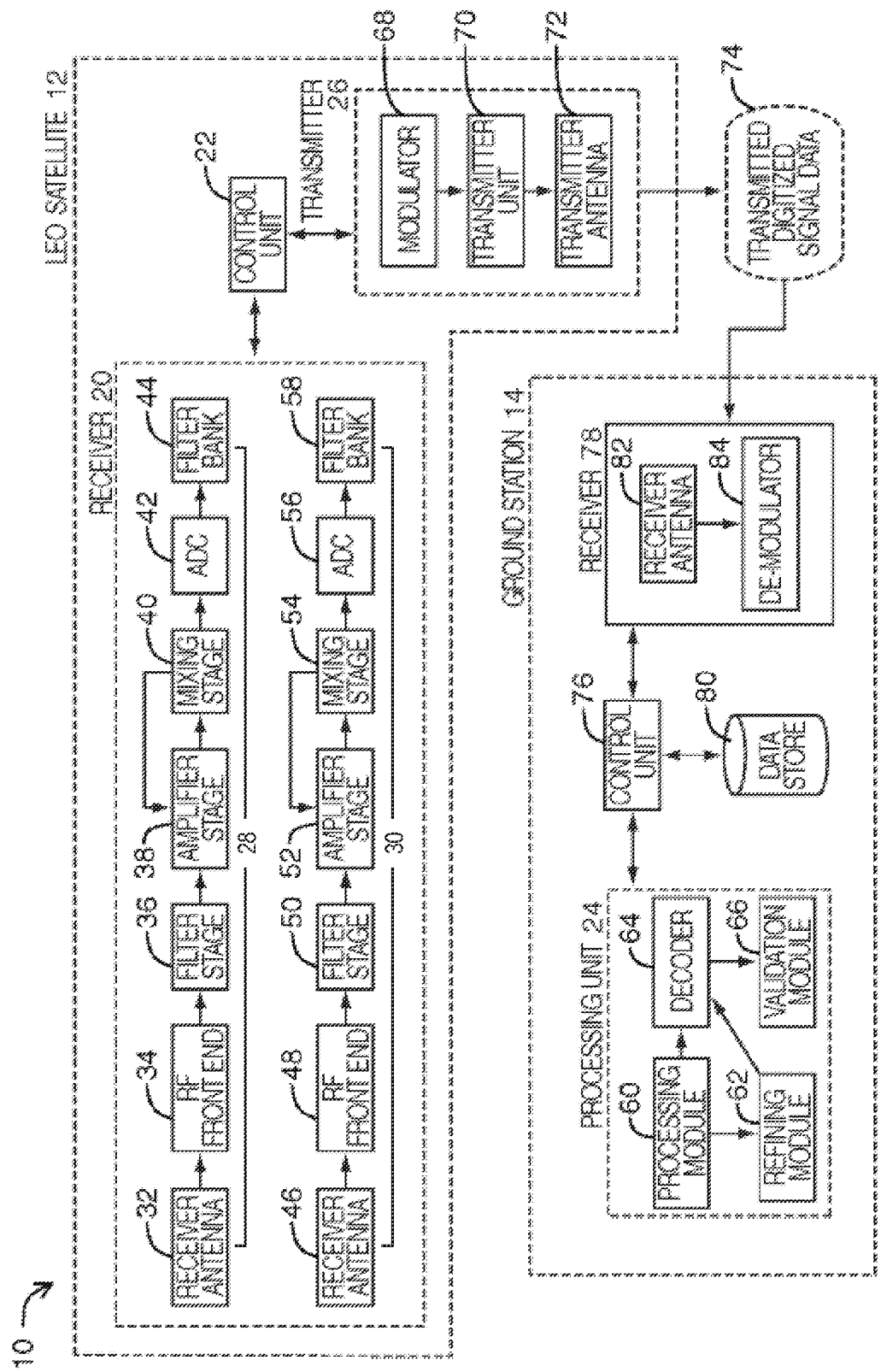
FIG. 2 is a block diagram of an exemplary embodiment for the LEO satellite and ground station of FIG. 1.

Referring now to FIG. 2, there is illustrated a block diagram of an exemplary embodiment for the LEO satellite 12 and the ground station 14 of the AIS processing system 10. In general, the LEO satellite 12 comprises a receiver 20, a control unit 22, and a transmitter unit 26. The receiver 20 comprises a first receiver channel 28, and a second receiver channel 30. The first receiver channel 28 comprising a first receiver antenna 32, an RF front end 34, the latter comprising a front end filter and a low noise amplifier, a filter stage 36, an amplifier stage 38, a mixing stage 40, an ADC 42 and a filter bank 44. The second receiver channel 30 comprises similar components numbered 46 to 58. In some embodiments the second receiver channel 30 is not used, as will be described in more detail below. Also, in some embodiments, the mixing stages 40 and 54 are not used if the ADC 42 and 56 operates at a sufficiently adequate sampling rate. The transmitter 26 generally comprises a modulator 68, a transmitter unit 70 and a transmitter antenna 72.

In operation, the receiver 20 may receive a plurality of AIS signals, pre-process the plurality of AIS signals to obtain digital input data. The digital input data can be provided to control unit 22. The digitized signal data can be modulated by the modulator 68 and transmitted via the transmitter antenna 72, as transmitted digitized signal data 74 to the ground station 14.

The ground station 14 is equipped with a processing unit 24, control unit 76, a receiver 78 and a data store 80, such as a database stored on a suitable storage medium. The receiver 78 includes a receive antenna 82 and a de-modulator 84 to de-modulate the transmitted digitized signal data 74 that are received by the ground station 14. The control unit 76 controls the operation of the ground station 14, and can be used to retrieve the decoded message segments from the processor 24, store these decoded message segments on the data store 80, and later recall the stored decoded message segments. The ground station 14 can also include a transmitter (not shown) for sending the decoded message segments to interested parties. For example, various security and intelligence organizations may be interested in reviewing all validated decoded message segments, and as such it is necessary to store them in the data store 80 for later recall. For instance, the decoded messages can be distributed in encrypted form via the Internet.

The processing unit 24 comprises a processing module 60, a refining module 62, a decoder 64 and a validation module 66. In some embodiments the refining module 62 is not used, as will be described in more detail below.

The receiver 20 may comprise multiple antennas and multiple receiver channels; in FIG. 2 there are two receiver channels 28 and 30, one for each receiver antenna 32 and 46. However, in some embodiments only one receiver channel is used. Accordingly, for simplicity of explanation, the components of only one receiver path will be described. The receiver antenna 32 is a Very High Frequency (VHF) antenna that can be configured to receive AIS signals transmitted over the AIS1, AIS2 and USAIS channels. In embodiments with two receiver channels, the receiver antennas 32 and 46 can be polarized in a different manner to provide an additional processing gain for detecting and decoding AIS signals. For example, the receiver antenna 32 can have a right circular polarization, and the receiver antenna 46 can have a left circular polarization. Typically, the transmitter antenna used by the AIS transmitter device 18 of a given ship 16 transmits AIS signals with a vertical linear polarization, which generally implies that transmissions from particular locations have fairly well defined polarizations. In embodiments with two receiver channels and two circularly polarized antennas, this polarization may manifest itself as a phase shift between the AIS signals received by the two receiver antennas 32 and 46. That is, the AIS signal received by the receiver 46 may be a phase-shifted version of the corresponding AIS signal received by the receiver 32. This phase shift may provide a mechanism for distinguishing between overlapping AIS signals, or for detecting anomalous message signals. Moreover, due to the vertical linear polarization of the transmitter antenna of the AIS 18 of a given ship 16, the AIS signals that are received by the circularly polarized receiver antennas 32 and 46 and correspond with one another generally have similar amplitudes.

In general, the receiver 20 is configured to receive an AIS signal in the Radio Frequency (RF) range and convert it to a baseband digital signal (i.e. digital input data). This pre-processing and conversion performed by the receiver 20 may be achieved in numerous ways and incorporates standard operations in signal processing. For instance, according to the exemplary embodiment shown in FIG. 2, considering receiver channel 28, an AIS signal is first received by the receiver antenna 32 and processed by the RF front end 34. The RF front end 34 comprises filtering and amplification components. The filtering components provide a first level of filtering to remove interfering signals, including intermodulation products caused by out of band carriers, as well as other noise. The filters may generally only have modest selectivity, but generally have very low loss since any loss at this stage comes directly off the overall system noise figure. At this stage, the filtering components can include a VHF filter, which can be an LC type filter, and the amplification components may comprise a low noise amplifier following the first level of filtering to boost the signal to a reasonable level.

The output of the RF front end 34 then can be processed by the filter stage 36 that provides another level of more selective filtering. The filter stage 36 includes a wide band channel filter with a passband for transmitting all three AIS channels (i.e. AIS1 at 161.975 MHz, AIS2 at 162.025 MHz, and USAIS at 157.375 MHz). Alternatively, two combined filters may be used, one filter for the AIS1 and AIS2 channel and one filter for the USAIS channel, which may eliminate some interference between the two channels (i.e. AIS1/AIS2 and USAIS). The filter stage 36 generally employs a surface acoustic wave filter that can provide the sharp filtering that is needed.

The received signals then can be processed by the amplifier stage 38 for adjustment of signal amplitude so that the full quantization range of the ADC 42 can be utilized during digitization. Accordingly, the amplification stage 38 comprises variable gain amplifiers and feedback can be provided from the mixing stage 40 so that an automatic gain control (AGC) block (not shown) in the amplifier stage 38 or the mixing stage 40 can adjust the amount of gain, or alternatively attenuation, that is provided by the amplifier stage 38. Alternatively, in other embodiments, the control unit 22 can comprise an AGC component for controlling the amount of gain, or attenuation, provided by the amplifier stage 36.

In this sense, the receiver channel 28 employs distributed amplifying and filtering using several amplification and filtering components to reduce the performance burden on any one of the components and avoid any non-linearities that may otherwise be encountered. The way in which amplification is distributed throughout this RF processing chain is a matter that depends on detailed considerations of power consumption, noise figure, and intermodulation products.

The output of the amplifier stage 38 is then processed by the mixing stage 40, and digitized by the ADC 42. The mixing stage 40 downconverts the VHF signals to an Intermediate Frequency (IF) band such as 25 MHz, which means that a lower sampling rate can be employed to reduce the requirements of the ADC 42. The ADC 42 then samples the data. If a sufficiently fast ADC is available, with sampling rates greater than 400 MHz for example, then the conversion to an intermediate frequency can be omitted altogether and digitization can occur at this point. If an I and Q mixer were used, then the mixing stage 40 can provide output data at baseband. In any of these embodiments, the mixing stage 40 also generally comprises filters and amplifiers to provide further filtering and amplification or buffering. For example, filtering is employed at the output of the mixing stage 40 to eliminate image bands and local oscillator leakage. For instance, the mixing stage 40 can comprise a post mixer IF filter which can be an LC type filter.

The digitized data is then processed by the filter bank 44. For the case in which the data is sampled at IF, the filter bank 44 comprises means for downconversion to baseband, and narrowband filters to remove all out of band signals. For instance, a 20 kHz bandwidth linear phase digital filter can be used for each AIS channel to account for the expected range in possible Doppler shifts. A component for performing decimation (not shown) can also be included at this point to reduce the output sampling rate. In some embodiments, a Digital Signal Processor (DSP) can be used to implement the filter bank 44. In this case, the DSP can downconvert the digitized data to baseband, perform narrowband filtering, and perform decimation to produce digital input data. The AD6620 digital receive signal processor is one example of a DSP that can be used to produce digital input data that includes I and Q baseband data for each of the AIS channels.

Control unit 22 receives the digital input data from the receiver 20, and provides this data to the transmitter 26 which possibly encrypts, then modulates and transmits this data as transmitted digitized signal data 74 to the ground station 14. The modulator 68 may employ various digital modulation techniques such as a phase-shift keying (PSK) digital modulation scheme (i.e. modulates the phase of a signal). Examples include quadrature PSK or a higher-order PSK such as 8-PSK. The digitally modulated signal data may then be received by the transmitter unit 70 which includes circuitry for generating analog signals that correspond to the digital data, upconverts these analog signals to the frequency range required for transmission, and amplifies these signals so that they have the required signal strength that is needed for transmission to the ground station 14. These signals are then provided to the transmitter antenna 72 for transmission to the ground station 14. The transmitter antenna 72 at the LEO satellite 12 and the receiver antenna 78 at the ground station 14 can be configured for operation in, for example, the S band or the X band.

Since the message segments may be considered to include classified information that must be kept secure, encryption can also be employed prior to modulation. In these cases, the transmitter 26, for example, may comprise an encryption module (not shown) for encrypting the digital signal data before the modulator 68 modulates these message segments. In this case, the ground station 14 includes a corresponding decryption module (not shown) to decrypt the received data, after demodulation, to recover the original digital signal data.

The receiver 78 of the ground station 14 receives the transmitted digitized signal data 74, and pre-processes the received AIS signals to produce digital input data. In particular, receiver 78 may de-modulate the digitized signal data via de-modulator 84 to produce received digital input data that is provided to the processing unit 24 in order to detect and decode candidate AIS message signals.

This pre-processing may comprise fairly standard signal processing operations that can be performed with standard commercial hardware. The organization of the hardware and the processing can be modified in various ways as is commonly known by those skilled in the art. Accordingly, the embodiments discussed herein are simply intended to provide exemplary illustrations for performing this pre-processing.

The digital input data then can be provided to the processing unit 24 for detection and decoding of the AIS message segments. The processing unit 24 may provide the capability for parallel processing to potentially reduce computation time, as is commonly understood by those skilled in art. In some embodiments, processing of the digital input data may be shared with, or offloaded to, another processing unit 24.

Figure 3:
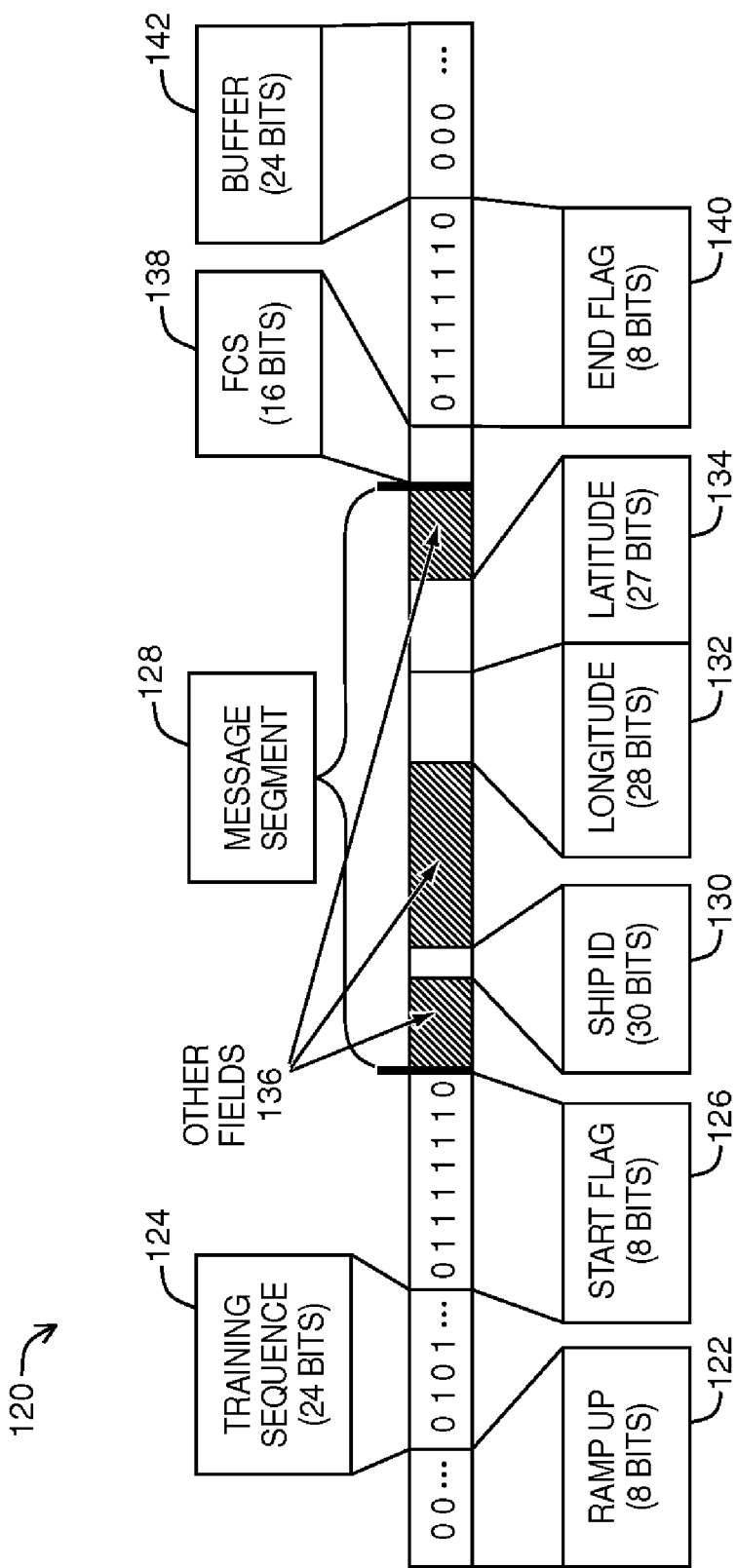
FIG. 3 is a diagram illustrating the data structure of an AIS message signal.

Once the processing unit 24 has received the digital input data, it can be provided to the processing module 60 for processing. The processing module 60 processes the digital input data to identify one or more candidate message signals and determine a corresponding Doppler offset estimate and time estimate for each candidate message signal. The processing module 60 generally processes the digital input data by employing correlation techniques. For example, the processing module 60 can process the digital input data with a plurality of predefined signals that correspond to Doppler offsets of a predetermined AIS code sequence (e.g. a training sequence and start flag as shown in FIG. 3 can be used) to compute a plurality of correlation signals.

After computing the plurality of correlation signals, the processing module 60 may scan the correlation signals for correlation peaks (i.e. amplitude peaks) that exceed other peaks by a predetermined amount in order to identify the one or more candidate message signals. Generally, the correlation peak should exceed the amplitude of any subsequent peaks that lie within one signal length (i.e. 26.67 ms) of the data segment that is being analyzed. The correlation peak associated with a candidate message signal may provide an estimate of its Doppler offset and timing. The processing module 60 may be implemented using a cluster of processing components, described in more detail below, to compute the correlation signals using the predefined signals that correspond to Doppler offsets of a predetermined AIS code sequence in parallel to reduce the processing time.

In some embodiments, after identifying one or more candidate message signals, the processing module 60 may provide this group of candidate message signals to the refining module 62. The refining module 62 refines the group of candidate message signals by sorting the candidate message signals in this group by their corresponding time estimate. The refining module 62 may then determine whether any of these candidate message signals is repeated at a different Doppler offset estimate; if so, the refining module 62 removes all repeated candidate message signals from the group. Finally, the refining module 62 may remove all candidate message signals that are overlapped on their high time side by a stronger candidate message signal. This operation ensures that time is not wasted trying to decode questionable signals. In this case, it is unlikely that a signal can be decoded if its message segment is overlapped by an equally strong, or stronger, signal, regardless of Doppler offset. The remaining candidate message signals comprise a refined group of candidate message signals, which the refining module 62 forwards to the decoder 64. The refining module 62 will typically alleviate the computational time required to decode all candidate message signals that are identified by the processing module 60, since the refined group of candidate message signals is generally (much) smaller in size than the group of candidate message signals identified by the processing module 60.

The decoder 64 decodes one or more candidate message signals to obtain (or extract) the AIS message segment contained therein. In some embodiments, the decoder 64 receives the one or more candidate message signals from the processing module 60. In other embodiments, the decoder 64 receives the one or more candidate message signals from the refining module 62. In both cases, there are no predetermined code sequences within the message segment, so correlation techniques may not be helpful to decode a candidate message signal. In some circumstances, the candidate message signals may contain specific identification numbers, such as a Maritime Mobile Service Identity, or specific locations. As such, in some cases, there may be some fixed known code sequences within the message segment, which can be used to employ correlation techniques. However, in cases where no such fixed known code sequences exist, the decoder 64 may employ various decoding procedures to extract message segments from the one or more candidate message signals. For example, the decoder 64 may perform Viterbi Decoding (or more generally dynamic programming), as is explained in further detail below. In any event, prior to decoding, a more precise Doppler offset estimate and time estimate is obtained for the candidate message signals, as will be discussed below, regardless of whether the candidate message signals have been previously refined.

After the decoder 64 extracts message segments from the one or more candidate message signals, the message segments are provided to the validation module 66. The validation module 66 may initially validate the decoded message segments for proper AIS signal message formatting by checking each decoded message segment for valid bit stuffing and then removing all bit stuffing. The bit stuffing is specified by the AIS signal specification, where a 0 is inserted into the message segment after any sequence of five successive 1's in the message and frame check sequence portion of the message segment. This is done to avoid the occurrence of spurious start and stop flags. The validation module 66 may also verify a frame check sequence field of the decoded message segment. If a decoded message segment passes these checks, it may be temporarily stored in a list of decoded message segments that have been validated initially.

Beyond initial validation, validation module 66 may perform additional validation as described further herein.

In some embodiments, the processing unit 24 can be a computing cluster and may be implemented as a parallel processing system using standard components such as a server (local or remote), a plurality of processors, a non-transitory computer readable memory (both volatile and/or non-volatile) and a computer operating system. These components can be linked via local or wide area network. Although they are illustrated as being contained within a single ground station 14, various components may be geographically remote with respect to the ground station 14.

The specifics of the downlink path are not described in detail, as it is largely dependent upon frequency allocations obtained from regulatory bodies. However, when the detection and decoding is performed at the ground station 14, the system 10 can be configured such that the downlink path accommodates a data transmission rate of around 3 Mbps.

It should be noted that the control units 22 and 76 and the processing unit 24 also can be implemented using a processor. In some embodiments, the control unit 76 and the processing unit 24 can be implemented with the same processor. In addition, in some embodiments, the transmitter 26 and the receiver 78 can also employ a processor. Furthermore, it should be noted that the various embodiments of the LEO 12 and the ground station 14 generally employ a combination of hardware and software. For instance, the components of the processing unit 24, the modulator 68 and the de-modulator 84 can be implemented using software executed by a processor. Furthermore, it should be understood that there can be embodiments in which these components are organized in a different fashion but perform the same functionality.

In addition, although the embodiments shown in FIG. 2 illustrate a particular system configuration, it should be understood by those skilled in the art that numerous other system configurations can be employed. For example, some components of the processing unit can be implemented at a LEO satellite, such as the processing module.

Referring now to FIG. 3, shown therein is a diagram illustrating the data structure of an AIS message signal 120. The AIS message signal 120 includes a ramp-up field 122, a training sequence 124, a start flag field 126, and a message segment field 128 including a ship ID field 130, a longitude field 132, a latitude field 134 and several other fields 136. The AIS message signal 120 also includes a Frame Check Sequence (FCS) field 138, an end flag field 140 and a buffer field 142. The ramp-up field 122 usually coincides with the powering up of the AIS transmitter device 18 of a given ship 16. The training sequence field 124 is included to allow the receiver of a conventional AIS 18 to perform carrier recovery. The start flag field 126 is a predetermined AIS code sequence that indicates the start of the message field. The message segment field 128 contains information relating to the ship 16 from which the AIS signal was sent, such as the ship ID 130 and the longitude 132 and the latitude 134 of the ship location. The other fields 136 also include information related to the ship including the navigation status, rate of turn, true heading, etc. as well as other information such as a time stamp indicating when the information was obtained. The frame check sequence field 138 is used for error detection, and can be used to determine whether any AIS message signal data is altered during transmission. The end flag field 140 is another predetermined AIS code sequence that indicates the end of the message and frame check sequence fields. The buffer field 142 generally contains no information and is included to prevent the message overlapping into an adjacent time slot; the transmitter typically starts to power down once the stop flag is transmitted.

AIS transmitter devices may exhibit some timing and frequency error, due to specific implementation and construction details. However, in general, most AIS transmitter devices can be assumed to be transmitting valid information. But there may be certain AIS transmitter devices that transmit intentionally incorrect data, for example to falsify position reports, spoof position reports of other ships, or simply due to malfunction.

Conventional AIS detection systems may lack the ability to validate the accuracy of AIS position reports. Alternatively, while they may offer limited ability to validate AIS message signals, they may rely on precise time and position references on board the satellite (e.g., satellite ephemeris and highly accurate synchronized time sources). For example, one conventional system checks reported position by determining the propagation delay from the ship to the satellite and comparing this to a predicted delay based on the reported ship position as compared to the satellite position. This requires precise position references on board the satellite and a satellite timing clock that is accurately synchronized to that on the ship, and it can only be used to determine the range of the transmitter from the satellite. Inaccuracies in the on-board time source, or the lack of ephemeris for the specific satellite that received the AIS message signals in question, may significantly degrade or disable the ability to perform such validation.

Accordingly, the described methods and systems describe embodiments that enable the validation of AIS message signals, for example to detect ships that are attempting to falsify their position reports or to falsify their identities. Moreover, the described methods and systems can perform validation without the need for satellite ephemeris or for synchronized clocks, and can generate a model of the satellite position from a set of AIS message signals received from a plurality of ship-based transmitters. This may be of particular interest for national and international security applications, and may be used in conjunction with other systems, such as space-based radar, or as part of a comprehensive shipping traffic monitoring system.

The described methods and systems can be used in conjunction with AIS (Automatic Identification System) message detection by satellite as described herein. In particular, auxiliary parameters or message characteristics, obtained during the AIS message decoding, can be used to validate the reported AIS transmitter positions and to characterize each AIS transmitter itself.

The proposed method checks position using both timing and Doppler shift, and can obtain both range and directional information. No on-board references are required; the necessary calibration is derived from the data set itself. In addition, the method has provision for characterizing the timing and frequency errors of individual transmitters, and this can be used to enhance the accuracy of the position determinations.

As described elsewhere herein, although AIS was conceived as a means for improving short range ship to ship communications and enhancing maritime safety, it also has many other potential applications. Detection of AIS signals by LEO satellites is possible, and constellations of such satellites provide a means for global monitoring of shipping traffic, which is of considerable interest for national and international security.

Satellite detection also enables a number of auxiliary parameters or message characteristics to be determined, some of which may be useful to characterize individual transmitters, and some of which may be useful to characterize the locations of those transmitters. This enables a number of consistency checks to be performed, and allows anomalous messages to be flagged.

Therefore, in addition to the AIS messages themselves, parameters and message characteristics that can be identified comprise:
- the arrival time of the AIS message signal (which can be used to determine propagation delay), or the start time of the message (e.g., in seconds, calculated, for instance, as the start of the training sequence relative to an arbitrary time reference, such as the start of the information in a data file comprising the plurality of AIS message signals).
- the amplitude of the signal received by the antenna with a first polarization;
- the amplitude of the signal received by the antenna with a polarization different from the first polarization;
- the polarization phase shift between the signals in the two or more antennas (e.g., assuming right and left circularly polarized antennas)—this may be expressed, for example, in degrees between the signals in the two antennas;
- the Doppler shift of the AIS message signal (e.g., velocity relative to the velocity of light, where velocity is positive when the object is moving away from the observer);
- a correlation or training sequence that was used in the AIS message signal;
- the modulation index (nominally 0.5) of the message signal;
- the estimated arrival time standard error in seconds;
- the estimated Doppler shift standard error;
- the estimated modulation index standard error;
- the estimated polarization phase shift standard error in degrees;
- the mismatch between the ideal signal and the signal received by the polarization 1 antenna; and
- the mismatch between the ideal signal and the signal received by the polarization 2 antenna.

In addition, if more than two antennas are present, differentiated spatially or by polarization, then additional amplitude and phase shift parameters may be included to characterize all of the available signals.

For the purposes of illustration, it will be assumed that each satellite has at least two differently polarized antennas. The use of at least two antennas with different polarizations allows the polarization orientation of an incoming AIS signal to be determined, and allows increased discrimination between signals overlapping in time. Generally, VHF antennas that can be mounted on small LEO satellites have very little directivity, and give very little indication of the origins of an AIS signal. If additional spatially separated antennas are available then directivity can be further increased. However, the described methods and systems can also be used with a single antenna polarization, possibly with reduced accuracy and directivity.

The first five of the above parameters generally provide information about the location of the AIS transmitter, while parameters such as the training sequence and modulation index generally provide information about the transmitter itself.

Furthermore, each AIS message generally contains reported position (e.g., provided in values of latitude and longitude).

The arrival time and the Doppler shift can be of particular importance for providing an independent determination of position. The propagation delay of an AIS signal from a ground based transmitter to a LEO satellite typically varies from between 2 to 10 ms, depending on whether the transmitter is directly below the satellite or is on the horizon. Transmitters are accurately synchronized to UTC, and if the satellite also has a synchronized clock, then the propagation delay of a message relative to the start of its transmission slot can be determined from the arrival time. However, such determinations may be subject to some error, as timing jitter may be present in the transmitter (e.g., the AIS standard permits up to ±3 bits, which equates to ±312 μs, which can result in a position determination error of ±94 km).

Given the reported position of the transmitter contained in the AIS message, and assuming that the satellite location is accurately known at the time of reception, the propagation delay can be calculated, and this expected value compared to the directly measured value.

The Doppler shift of an AIS message signal can also be used in a similar way to determine position. If the location, speed and direction of travel of the satellite are known, then the expected Doppler shift for a given transmitter location can be computed and compared to the Doppler shift measured at the satellite. However, this measurement is also subject to error, principally due to the frequency tolerance on the transmitter. In practice, frequency errors are generally indistinguishable from Doppler shift. The AIS standard permits an error of ±3 ppm (±480 Hz), which is approximately 14% of the maximum expected Doppler shift in satellite detection. Accordingly, frequency error may produce position estimation errors comparable to those associated with the propagation delay.

In some cases, the signal amplitude and polarization of AIS messages can also be used to provide positional information. However, the received signal amplitude is weakly dependent on the transmitter location, as the increased transmitter antenna gain at low elevations may balance out the effects of the greater distance to the satellite. In addition, the signal amplitude may be dependent on effects such as multi-path propagation and atmospheric attenuation.

A similar issue exists with the polarization. Transmitter antennas generally have a vertical polarization, and, in principle, two nearby ships should produce similarly polarized signals at the satellite. In practice, however, errors may arise due to the motion of the ships. Moreover, the signal polarization may experience a large Faraday rotation in the ionosphere (in some cases several full rotations). In simulations, this strong dependence on the propagation path limited the ability to estimate position based on polarization alone.

The training sequence is part of a standard preamble in AIS signals that is used to synchronize AIS receivers. This generally provides no information about the transmitter location but can serve to characterize the transmitter itself.

The AIS standard specifies that the training sequence should be a sequence of twenty-four (24) alternating 0's and 1's, and in practice this may be either "010101 . . . " or "101010 . . . ", depending on the transmitter. In addition, the AIS standard specifies that non-return to zero inverted (NRZI) encoding of the data is to be used. In NRZI encoding, a signal transition occurs for a 0 in the input data stream, and no transition occurs for a 1 in the input data stream. However, the sense of the transitions at a given point in the training sequence may be $-1 \rightarrow 1$ or $1 \rightarrow -1$, and both situations may arise in practice. These factors are generally fixed for a given transmitter. Therefore characterization of the training sequence, both in terms of bit selection and transition sense, can provide a useful characterization of the transmitter.

According to the AIS standard, the modulation index used by a transmitter should have a value of 0.5, meaning that each bit in the input sequence advances or retards the signal phase by $\pi/2$. In practice, however, transmitters generally fail to honour this requirement with any great accuracy. Accordingly, modulation index values in the range of 0.4 to 0.6 may be encountered. However, the modulation index generally remains remain relatively constant for a given transmitter, and therefore may provide another useful characterization.

The above parameter set may comprise statistical error estimates for the accuracy of the message characteristics or parameters, which can provide a useful comparative guide. The mismatch between two functions, $f$ and $g$, can be given by:

$$M = \frac{\left| \int_{-\infty}^{\infty} f(t) g^*(t) dt \right|^2}{\int_{-\infty}^{\infty} |f(t)|^2 dt \int_{-\infty}^{\infty} |g(t)|^2 dt} \leq 1 \quad (1)$$

and lies in the range 0 to 1. The mismatch is equal to 1 when the two functions are identical apart from a multiplicative constant. Mismatch values between the ideal waveform and the actual signals received by the two antennas can also be included in the parameter set. These can provide a useful figure of merit for assessing parameter reliability when strong interference is present.

Both position dependent parameters and transmitter dependent parameters may be useful. Position dependent parameters generally facilitate the detection of ships spoofing their positions. Transmitter dependent parameters can be used to detect ships trying to spoof their identities.

In general, propagation delay and Doppler shift are only weakly dependent on the properties of the transmission medium, a property that can make these parameters suitable for verifying transmitter position. Moreover, propagation delay and Doppler shift can provide independent position estimates that are in many ways complementary.

The sensitivity of propagation delay to transmitter position is generally at a minimum when a ship is located directly under the receiving satellite. However, the variation of sensitivity with increasing distance is quite slow, particularly at long ranges.

Figure 4A:
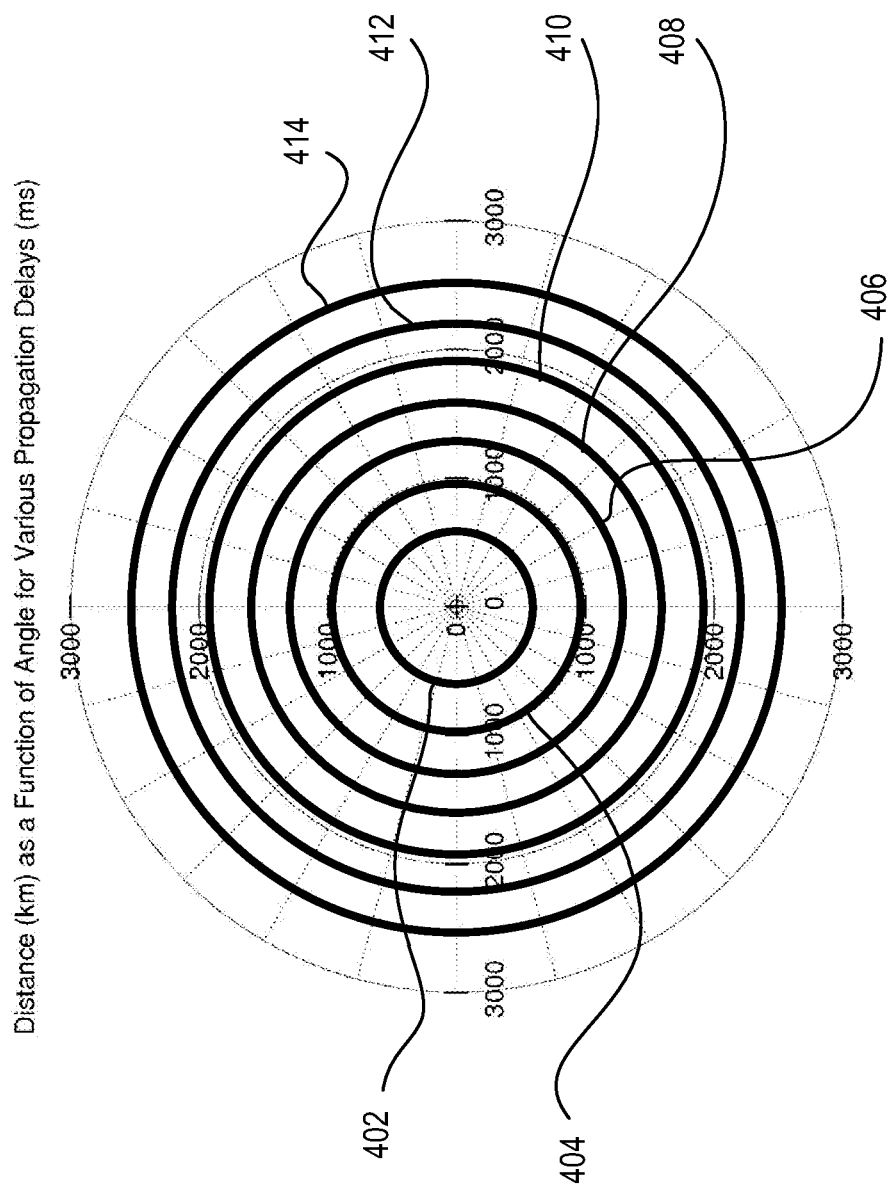
FIG. 4A is an exemplary plot illustrating AIS transmitter distance from a satellite as a function of angle for various propagation delays.

Referring now to FIG. 4A, there is illustrated a plot of AIS transmitter distance from a satellite, as a function of angle for various propagation delays. In FIG. 4A, the satellite is assumed to have an orbital radius of 7024 km. This orbital radius causes the minimum propagation delay (i.e., for a transmitter directly under the satellite) to be approximately 2.2 ms, while for a ship on the horizon the propagation delay is approximately 9.9 ms. The minimum propagation delay plot is shown as a point in the centre of the plot. The horizon propagation delay plot is shown as contour line 414. Additional contour lines 402 to 412 illustrate other propagation delays. It can be observed in FIG. 4A that the contour lines are closest together at long ranges, indicating that these are the regions of greatest sensitivity, where a shift in a ship's position produces the greatest change in propagation delay. Nevertheless, propagation delay generally provides fairly constant range sensitivity.

Doppler shift can be another useful parameter for verification purposes. For a ship directly under the satellite, the Doppler shift can be approximately zero, but this is also the point where the rate of change of Doppler shift with respect to position is greatest. For a satellite with an orbital radius of 7024 km and a velocity of 7533 m/s, a change in Doppler shift of $10^{-6}$ corresponds approximately to a 26 km change in the position of such a ship in the direction of the satellite's orbit. However, at the extremes of the detection range (e.g., at long distances), Doppler shift varies very slowly with position.

Figure 4B:
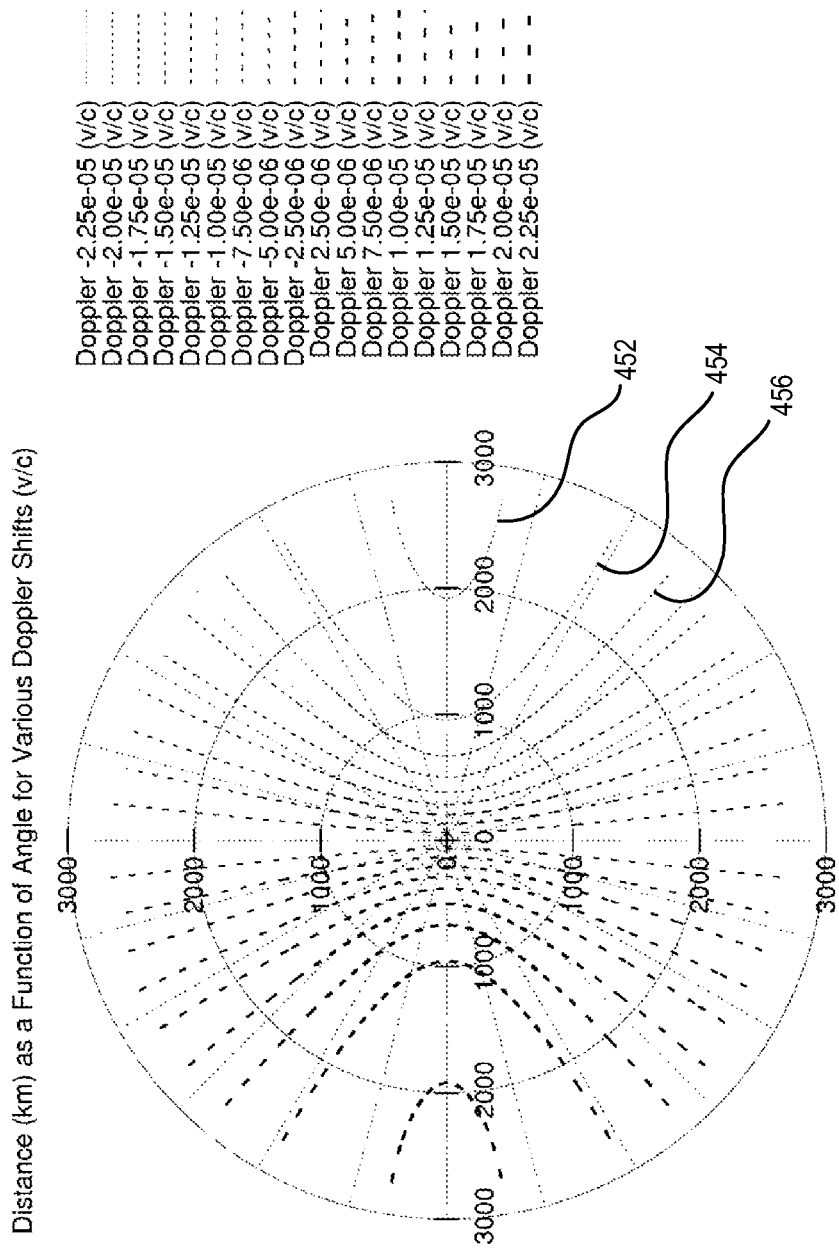
FIG. 4B is an exemplary plot illustrating AIS transmitter distance from a satellite as a function of angle for a range of Doppler shifts for a satellite moving in a given direction.

Referring now to FIG. 4B, there is illustrated a plot of AIS transmitter distance from a satellite, as a function of angle for a range of Doppler shifts for a satellite moving in a given direction (e.g., a positive direction "X"). As shown in FIG. 4B, contour line 452 corresponds to a Doppler shift of $-2.25 \times 10^{-5}$. From right to left, each successive contour line represents an increase in Doppler shift of $0.25 \times 10^{-6}$. For example, contour line 454 corresponds to a Doppler shift of $-2.00 \times 10^{-5}$, contour line 456 corresponds to a Doppler shift of $-1.75 \times 10^{-5}$ and so on (except that there is no contour line for zero Doppler shift). FIG. 4B is an approximation, which takes into account Doppler effects due to the motion of the satellite, but not those due to the rotation of the earth.

It can be observed that the orientation of the contours in FIG. 4B is mainly radial, indicating that the Doppler shift generally characterizes direction rather than range. In this sense, the propagation delay and the Doppler shift provide largely complementary information. However, for Doppler shift at long ranges in the direction of motion of the satellite, both range and directional accuracy may be reduced. For example, comparing contour 452 (for a Doppler shift of $-2.25 \times 10^{-5}$) and contour 454 (for a Doppler shift of $-2.00 \times 10^{-5}$)—which represents a change in Doppler shift of just $2.5 \times 10^{-6}$—it can be observed that the corresponding change in range is approximately 400 km for a Doppler shift of $10^{-6}$. Accordingly, at longer ranges, measuring change in Doppler shift can be less accurate than the corresponding measurement based on propagation delay.

If the location, velocity and direction of travel of the satellite are accurately known, then both the expected propagation delay and the expected Doppler shift can be calculated for a given transmitter location. The Doppler shift can also be measured directly, as can the propagation delay, though for Doppler shift the local time reference (e.g., clock) on the satellite does not need to be accurately synchronized to UTC. These measured values can then be compared to the expected values to determine the reliability of the reported position.

The synchronized clock and accurate position and velocity information would normally rely on GPS, and the necessary information would need to be provided by the satellite when downlinking AIS data (e.g., embedded into the downlinked data). However, in some circumstances, a synchronized time reference and accurate satellite position and velocity information (e.g., ephemeris) may not be available. For example, this GPS capability may not be present on the satellite, or may not be transmitted with downlinked AIS data. However, even in the absence of a synchronized time reference and ephemeris, the arrival time and Doppler shift may still be used to check transmitter location. That is, a plurality of AIS message signals, forming a data set captured by one or more satellites, may be gathered. This plurality of AIS message signals can then be validated to identify selected message signals that are inconsistent with the characteristics of the larger plurality, as described further herein.

Figure 5:
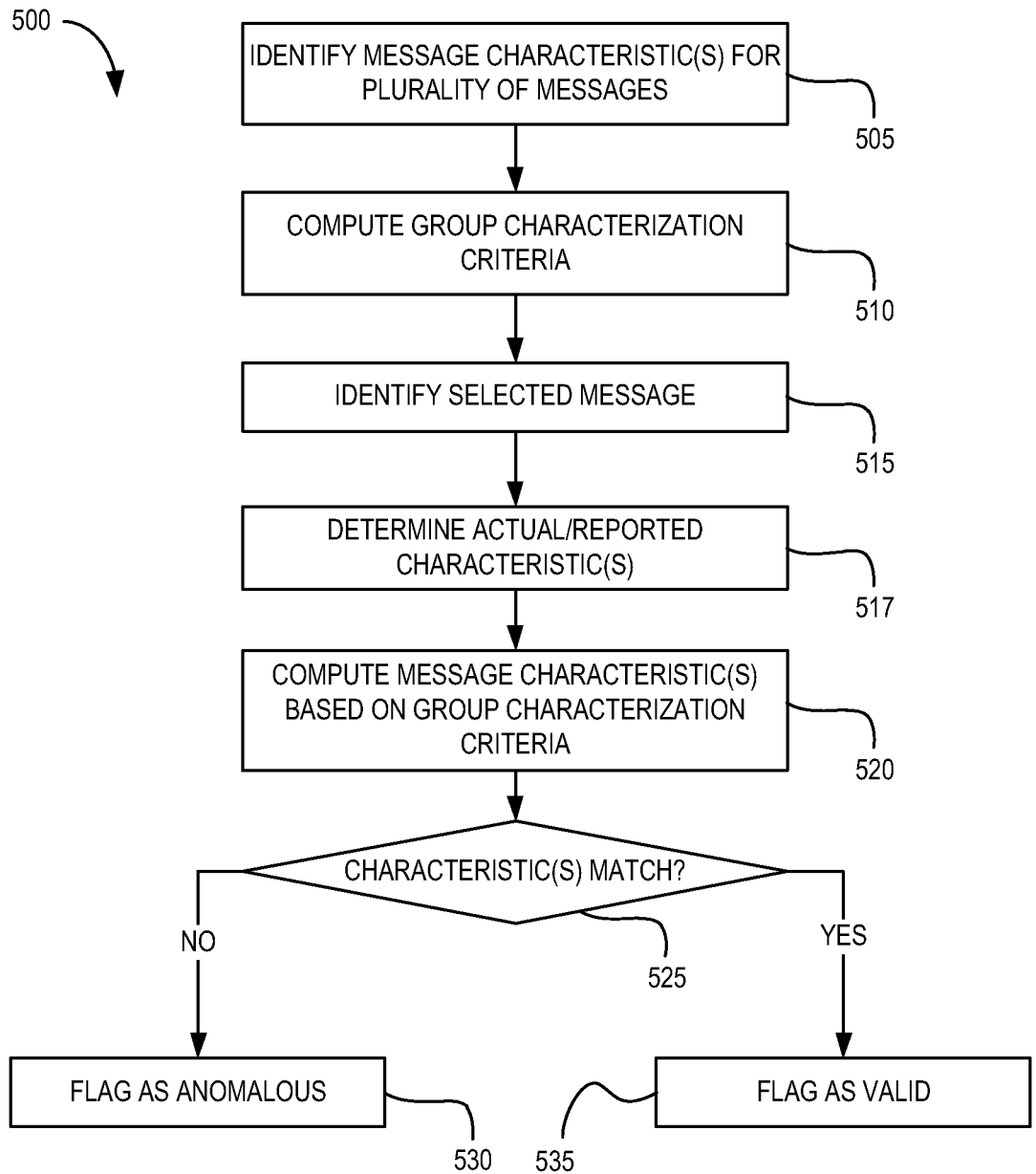
FIG. 5 is an exemplary process flow diagram of a method for detecting anomalous AIS message signals.

Referring now to FIG. 5, there is illustrated an exemplary process flow diagram of a method for detecting anomalous AIS message signals in a plurality of AIS message signals received by at least one satellite in space.

Process flow 500 can begin at 505, by identifying a plurality of message characteristics associated with the plurality of AIS message signals. Message characteristics may comprise parameters associated with individual (e.g., selected) AIS message signals, such as propagation delay, Doppler shift, amplitude, polarization, etc.

At 510, one or more group characterization criteria can be computed based on the set of message characteristics associated with the plurality of AIS message signals. For example, in one example, the computation may comprise fitting a three variable function (e.g., where the variables comprise arrival time, and reported latitude and longitude) to selected message characteristics (e.g., propagation delay, Doppler shift, etc.), to provide a smoothed representation based on the average values for all of the ships in the field of view.

At 515, a selected message may be identified for validation and, at 517, an actual message characteristic may be determined. The actual message characteristic may be a measured message characteristic (e.g., arrival time, Doppler shift) or a reported position contained within the message.

At 520, message characteristics for the selected message can be computed based on the group characterization criteria, for comparison with actual (e.g., measured or reported) message characteristics at 525. For example, if the group characterization criterion is a smoothing function, the computed message characteristics can be generated using the smoothing function.

For example, if the actual message characteristic determined at 517 is the Doppler shift, then at 520 the estimated Doppler shift can be computed for a selected message based on the arrival time and the reported latitude and longitude of the transmitter contained within the selected message.

In another example, if the actual message characteristic determined at 517 is the reported transmitter position (e.g., latitude and longitude), then at 520 an estimated transmitter position can be computed based on the measured message characteristics of selected messages. That is, the measured propagation delay and Doppler shift values for the selected message can be used, in conjunction with the group criteria, to estimate the latitude and longitude of the transmitter.

At 525, the actual message characteristic of the selected message signal may be compared to the computed message characteristic, to determine if the characteristics conform within a predetermined tolerance. The predetermined tolerance may be a simple percentage value or a statistical measure such as standard deviation. As described with reference to FIGS. 4A and 4B, the size of predetermined tolerance may also vary according to the value and type of the message characteristic being evaluated. For example, the predetermined tolerance may be larger when computations are based on Doppler shift and a large distance from the satellite is computed, since Doppler shift exhibits a relatively large range of possible values at longer distances.

Generally, message characteristics may exhibit errors due to uncertainties originating from a variety of sources, including transmitter errors, variations in the transmission channel, receiver uncertainties, and data fitting errors.

Table 1 illustrates estimated standard deviations associated with various types of uncertainties.

TABLE 1

| Parameter | Error sources | | | |
|---|---|---|---|---|
| | Transmitter | Channel | Receiver | Data Fitting |
| Propagation Delay (sec) | $1.0 \times 10^{-4}$ | Negligible | $1.0 \times 10^{-6}$ | $3.0 \times 10^{-5}$ |
| Doppler Shift (v/c) | $1.0 \times 10^{-6}$ | Negligible | $1.0 \times 10^{-8}$ | $3.7 \times 10^{-8}$ |
| Polarization (deg) | 11.0 | ~54.0 | 2.0 | 9.0 |

As shown in Table 1, the propagation delay is only marginally affected by variations in the propagation channel, and the estimated error in the receiver is very small, as is the residual error obtained when the smoothing function is fitted to the data.

However, as noted, the AIS standard permits a maximum synchronization error for transmitters of ±3 bits. Thus, the standard deviation for the timing error can be estimated at $1.0 \times 10^{-4}$ s. This uncertainty dominates all of the others, and would limit the sensitivity of any position checking to approximately 30 km. The sensitivity of propagation delay to position is a minimum when a ship is located directly under the satellite, but the variation of sensitivity with distance is quite slow, particularly at long ranges.

In contrast, the standard deviation for spoofed or anomalous AIS messages typically exceeds 3-4 standard deviations from their expected values. Accordingly, the predetermined tolerance can be set to at least 3 standard deviations, or even 4 standard deviations for rigorous checking.

If the actual message characteristics do not conform to the computed message characteristics, as based on the group characterization criteria, the associated selected AIS message signal may be flagged as anomalous at 530. Otherwise, the AIS message signal may be flagged as valid.

In some cases, fitting functions that are linear combinations of a certain group of basis functions such as spherical harmonics may be used. The computation of the resulting spherical harmonic coefficients may lead to computing the solution of a set of linear equations.

The accuracy of position estimates may be limited by the timing jitter and frequency tolerances of the individual AIS transmitters. Accordingly, in some cases, such estimates may lack a position resolution better than 50 km. However, in any given plurality of AIS message signals, there may be multiple message signals from an individual transmitter. Accordingly, estimation of the transmitter's systematic timing and frequency offsets can allow for the refinement of the group characterization criteria (e.g., smoothing function) and thereby improve the position estimation accuracy. The additional data from an individual transmitter can also be used to characterize the transmitter itself, which can be useful if one transmitter is attempting to spoof another.

The timing delay of a message relative to the start of its transmission slot is a useful characteristic for the purposes of consistency checking and AIS message validation. In some cases, the delay may be as much as 10 ms. This timing delay can be determined from the arrival time of an AIS message signal if the satellite local time reference is synchronized to the same source as that of the AIS transmitter (e.g., GPS). However, even without such synchronization, the time delay can still be determined up to an arbitrary time offset. This arbitrary time offset is not necessary to perform message signal consistency checking or validation.

If the duration of one time slot is $t_S$ (26.667 ms), then the quantity $T_D$, $0 \leq T_D < t_S$, can be computed such that:

$$T_D = t_A - t_S \lfloor t_A / t_S \rfloor \quad (2)$$

where $t_A$ is the message arrival time referred to some arbitrary start time, and $\lfloor x \rfloor$ is a floor function that gives the largest integer that is less than or equal to x. The $T_D$ values thus obtained naturally fall in a band approximately 8 ms wide, corresponding to the range of delays (2 to 10 ms) observed in practice, and within this band the $T_D$ values give the correct relative propagation delays of all the messages in the data set, though all are arbitrary up to some constant time offset.

Figure 6:
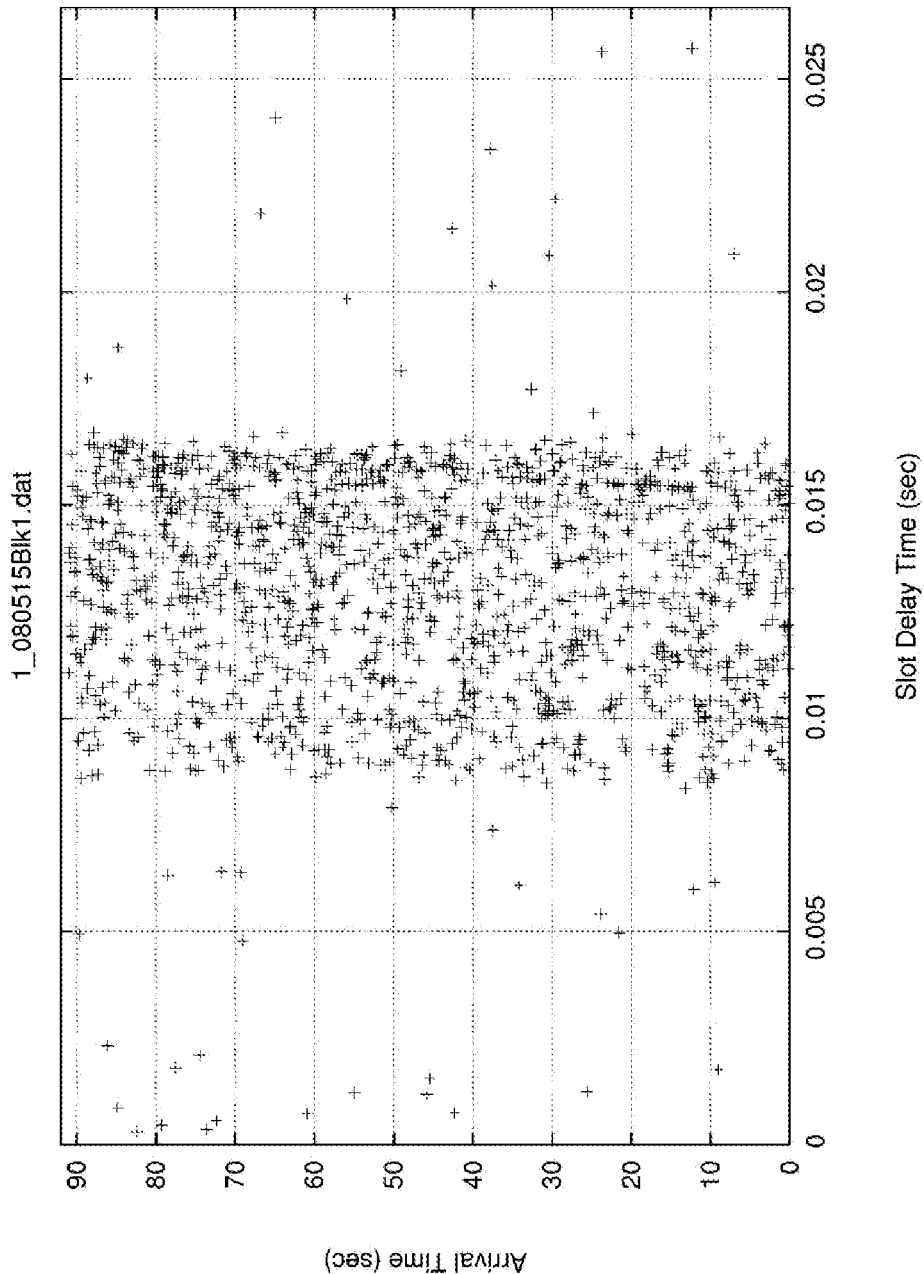
FIG. 6 is an exemplary plot illustrating the results of applying a band transformation to a sample plurality of AIS message signals captured by a satellite.

This property can be observed in FIG. 6, which illustrates the results of applying this transformation to a sample plurality of AIS message signals captured by a satellite over a ninety second interval. Referring now to FIG. 6, the arrival time of each AIS message signal is plotted against the value of $T_D$. It can also be seen that there are a few messages that lie outside the possible range of propagation delays (e.g., 0-8 ms). This indicates the presence of some unsynchronized transmissions for which it may not be possible to check the propagation delays by any means.

Generally, both the propagation delay and the Doppler shift can be uniquely determined if the transmitter location and the message arrival time at the satellite are known. Accordingly, functions of the form $$T_D = f(\theta, \phi, t) \quad (3)$$

and $$D = g(\theta, \phi, t) \quad (4)$$

can be specified, where $T_D$ is the propagation delay (s),

D is the Doppler shift (ratio of relative velocity to velocity of light v/c), $\theta$ is the polar angle of the transmitter determined from its reported position, $\phi$ is the azimuth angle of the transmitter determined from its reported position, and t is the message arrival time at the satellite.

Equations (3) and (4) are shown represented in terms of polar angles ($\theta$ and $\phi$) referred to some suitably chosen set of axes. This is purely for mathematical convenience, and the polar angles can be obtained directly from the reported latitude and longitude, or vice versa.

As noted above, if the satellite clock reference is synchronized to UTC, and if the satellite's location, velocity, and direction of travel are accurately known, then the values of $T_D$ and D can be calculated directly. However, the functions in equations (3) and (4) can also be determined, given a message data set (e.g., comprising a plurality of AIS message signals received at one or more satellites), by using a fitting procedure that seeks to minimize the least squares error quantities:

$$E_T = \sum_i (T_D^i - f(\theta_i, \phi_i, t_i))^2, \text{ and} \quad (5)$$

$$E_D = \sum_i (D_i - g(\theta_i, \phi_i, t_i))^2, \quad (6)$$

where the sums run over all of the messages in the data set. This fitting procedure does not require precise information about the satellite position or velocity, and does not require a clock synchronized to UTC. In effect, the message data set can be used to provide calibration. Detection of anomalous AIS message signals can thereafter be performed by identifying messages with $T_D$ and D values that deviate from the fitting functions by more than a predetermined threshold.

A similar approach can be applied to other message characteristics or parameters, such as signal amplitude and polarization.

In equations (5) and (6) a least squares fitting criterion is used. Other criteria can also be used, but least squares may be the easiest mathematically. Least squares fitting may also be desirable when errors are normally distributed, as the normal or Gaussian distributions may be reasonable representations of the errors encountered in practice.

To apply the fitting procedure, a suitable functional form can be selected for the functions $f$ and g. For convenience, a form may be chosen that uses a linear combination of fixed basis functions; the function coefficients can then be determined by solving a system of linear equations in the usual fashion. At least one form that can be suitable for the applications described herein is described by F. W. J. Olver, D. W. Lozier, R. F. Boisvert and C. W. Clark, eds., "NIST Handbook of Mathematical Functions", New York: Cambridge University Press, 2010, the entire contents of which are hereby incorporated by reference. In particular, an expansion in terms of the spherical harmonics, $Y_n^m(\theta, \phi)$, can be used:

$$f(\theta, \phi, t) = \sum_{n=0}^{\infty} \sum_{m=-n}^{m=n} a_{mn}(t) Y_n^m(\theta, \phi). \quad (7)$$

Spherical harmonics are frequently encountered in physical problems; they form a complete set of orthonormal functions, and any function of $\theta$ and $\phi$ can be represented in terms of them. Their normalization takes the form:

$$\int_0^{2\pi} \int_0^{\pi} Y_{n_1}^{m_1*}(\theta, \phi) Y_{n_2}^{m_2}(\theta, \phi) \sin\theta d\theta d\phi = \delta_{n_1 n_2} \delta_{m_1 m_2}, \quad (8)$$

and the time dependent coefficients in equation (7) can then be determined by the formula:

$$a_{mn}(t) = \int_0^{2\pi} \int_0^{\pi} Y_n^{m*}(\theta, \phi) f(\theta, \phi, t) \sin\theta d\theta d\phi. \quad (9)$$

Equations (7) and (9) are general, and in general any function $f(\theta, \phi, t)$ can be represented in this way. However, in some cases, for practical use, the maximum order of the spherical harmonics can be limited, and the time dependent coefficients can be represented in terms of discrete parameters. Generally, spherical harmonic order need not be greater than 10.

Accordingly, the spherical harmonics can be expressed as:

$$Y_n^m(\theta, \phi) = \left(\frac{(n-m)!(2n+1)}{4\pi(n+m)!}\right)^{1/2} e^{jm\phi} P_n^m(\cos\theta), \quad (10)$$

where $P_n^m(\cos\theta)$ are associated Legendre functions, and they have the symmetry properties:

$$Y_n^{-m}(\theta,\phi) = (-1)^m Y_n^{m*}(\theta,\phi) \quad (11)$$

and $$Y_n^m(\pi-\theta,\phi+\pi) = (-1)^n Y_n^m(\theta,\phi) \quad (12)$$

The associated Legendre functions may have many representations, but for practical computation they can generally be determined by recurrence relationships. The recurrence relationship:

$$(n-m)P_n^m(x) = (2n-1)xP_{n-1}^m(x) - (n+m-1)P_{n-2}^m(x) \quad (13)$$

which is stable in upward recurrence in n for any value of x, may be a suitable choice. The associated Legendre functions generally have the additional properties that:

$$P_n^m(x) = 0, \, 0 \le n \le m, \quad (14)$$

$$P_{-n-1}^m(x) = P_n^m(x), \quad (15)$$

$$P_m^{-m}(x) = \frac{(1-x^2)^{m/2}}{2^m m!}, \text{ and} \quad (16)$$

$$P_m^m(x) = (-1)^m \frac{(2m)!(1-x^2)^{m/2}}{2^m m!}. \quad (17)$$

These formulas, together with the recurrence relationship of equation (13), allow the associated Legendre functions to be computed.

The polar angles $\theta$ and $\phi$ can be referred to any chosen set of axes. However, a set of axes that rotates at least approximately with the satellite may be convenient to use in practice, as this can minimize the time dependence of the $\alpha_{mn}(t)$ coefficients. This choice of axes also eliminates the need to know the position of the satellite in its orbit (e.g., Equation (7)) as, for a circular orbit, one arc of the orbit may be transformed to any other by a constant rotation with respect to the new axes, and, with suitably chosen combinations of spherical harmonics, Equation (7) is invariant under such transformations. Many discrete representations of the $\alpha_{mn}(t)$ coefficients may be possible, using, for example, polynomials or spline functions. Spline functions may be convenient to use in practice, as the resulting set of linear equations has a band structure, which can improve efficiency during computation.

Comparisons between parameters or message characteristics for selected AIS messages, and values obtained from the fitting functions $f$ and $g$, may be subject to a variety of errors, including transmitter errors, variations in the transmission channel, receiver uncertainties and data fitting errors.

For the purposes of determining propagation delay and Doppler shift, transmitter timing jitter and frequency error are generally the most significant factors. Properties of the transmission channel may significantly affect the polarization shift, due to Faraday rotation in the ionosphere. To a lesser extent, the transmission channel may also affect signal amplitude, although the propagation delay and the Doppler shift are generally not affected significantly.

Determination and detection of AIS message signal characteristics or parameters at the receiver may need to be performed in the presence of noise and interference, and thus may be subject to some errors. However, in general, such errors can be estimated statistically, and generally have a significantly lesser effect than transmitter errors.

In general, the described group characterization and data fitting procedure is an averaging process, and the presence of some residual errors can be tolerated with little negative effect.

As noted above, position determination can generally be performed primarily based on the propagation delay and Doppler shift. The accuracy achievable with these parameters may be strongly dependent on the ship's location relative to the satellite.

In some cases, accuracy can be improved by accounting for, or removing, some of the systematic errors associated with transmitters. In particular, frequency error for a selected transmitter is likely to remain constant during a data capture interval (e.g., a ship may remain in view of the satellite for up to ten minutes). Similarly, the timing jitter in a particular transmitter may also have a significant systematic component over short intervals. Since the Maritime Mobile Service Identity (MMSI) of the transmitter (ship) is included in the AIS messages, transmitter characteristics, such as offsets for the systematic timing and frequency errors of a particular transmitter, may be estimated and used to refine the group characterization criteria. Transmitter characteristics may be a specific class of message characteristic, which describe a characteristic of the transmitter itself, rather than the location of the transmitter.

To compute transmitter characteristics, the least squares fitting problem can be modified to the minimization of:

$$E_T = \sum_i (T_D^i - f(\theta_i, \phi_i, t_i) - T_O^i)^2 \text{ and} \quad (18)$$

$$E_D = \sum_i (D_i - g(\theta_i, \phi_i, t_i) - D_O^i)^2 \quad (19)$$

where $T_O^i$ and $D_O^i$ are the unknown timing and Doppler offsets for a ship generating the i'th message. The quantities $T_O^i$ and $D_O^i$ can be additional adjustable parameters in the least squares fit. In general, at least two messages (and preferably ten or more) are used for each of the ships that are assigned offset parameters to facilitate the fitting process. When multiple messages from a particular ship are present, use of this approach can greatly reduce the position uncertainty, and can also provide some characterization of the transmitters themselves through the characteristic offset parameters $T_O^i$, and $D_O^i$.

Figure 7A:
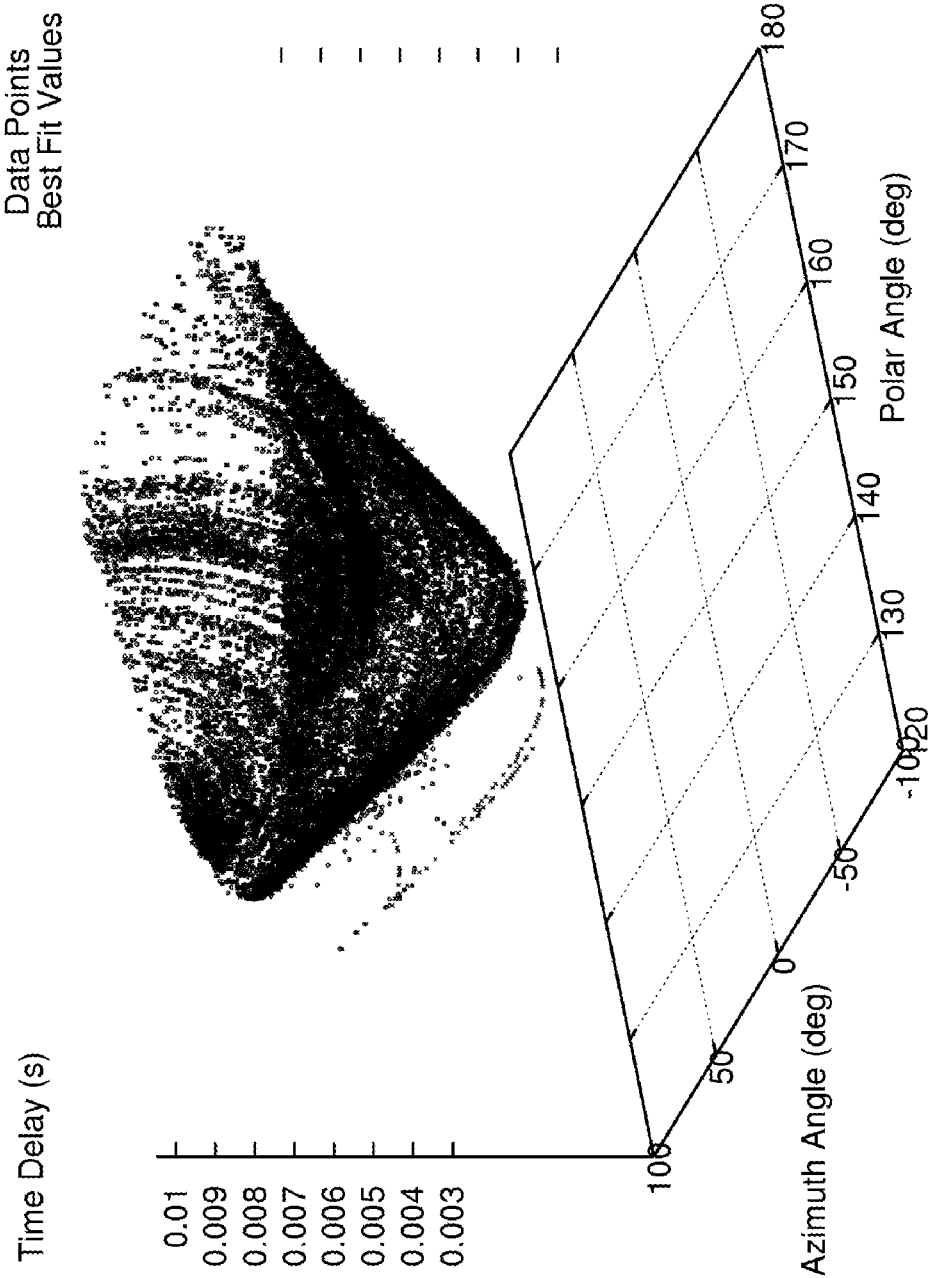
FIGS. 7A and 7B are exemplary plots illustrating propagation delay and the Doppler shift, respectively, when applied to a set of simulated AIS data.
Figure 7B:
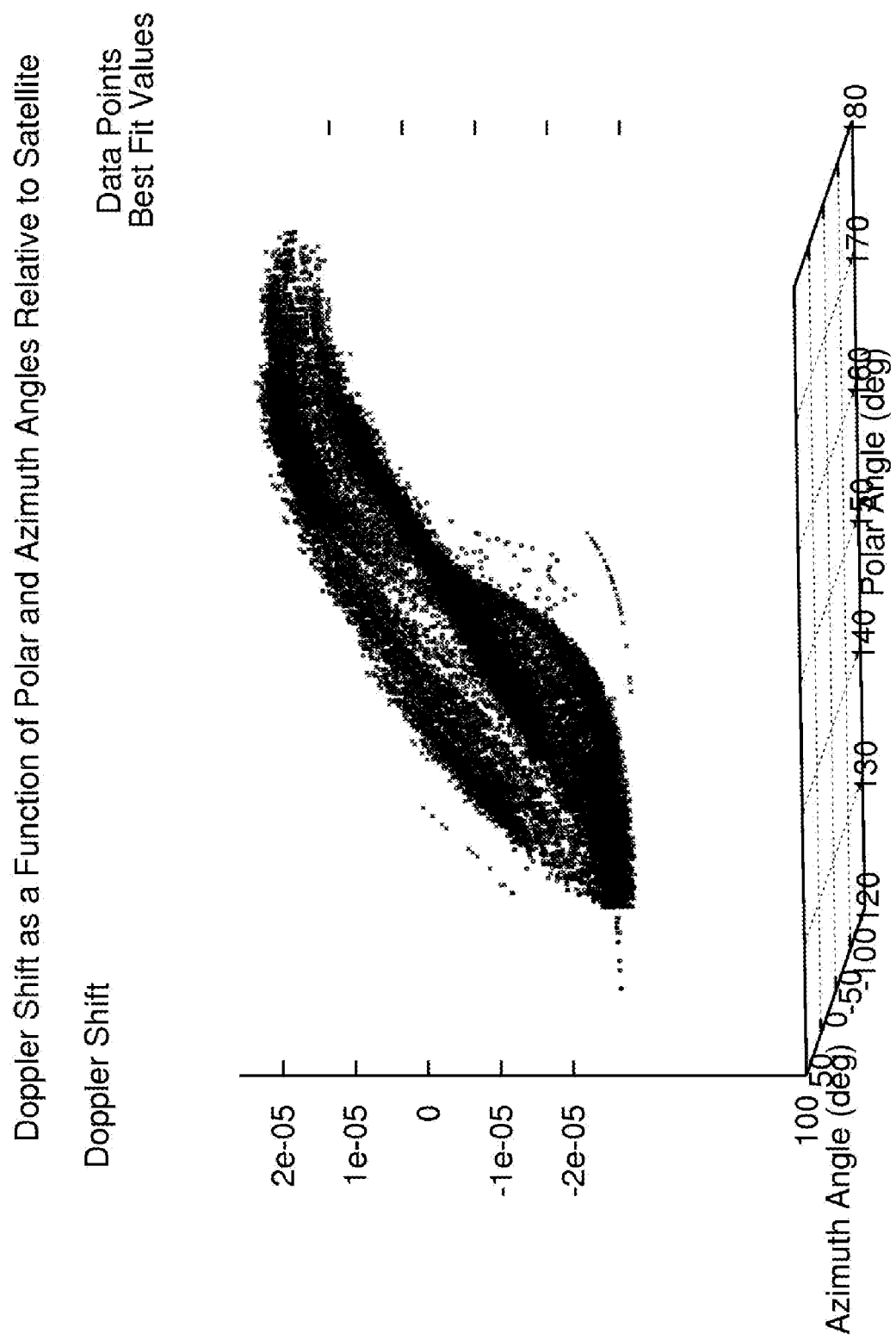

Referring now to FIGS. 7A and 7B, there are illustrated plots of propagation delay and the Doppler shift, respectively, when applied to a set of simulated AIS data. As shown, the polar and azimuth angles ($\theta$ and $\phi$) are referenced to a set of axes rotating approximately with the satellite; the origin of the axes is at the centre of the earth, and the z axis and x axes lie in the orbital plane of the satellite.

As shown in FIGS. 7A and 7B, the 'x' markers show the propagation delay and Doppler shift, respectively, as determined from the fitting functions for the reported latitude and longitude. Conversely, the circled dot markers show the time delays and Doppler shift, respectively, determined directly from the individual AIS messages. It can be seen that the markers produce clearly defined surfaces, and that the 'x' and circled dot markers are generally in close agreement. However, some lines of 'x' markers can be seen that lie well outside these surfaces. These lines, which deviate beyond a predetermined threshold, represent transmitters that are reporting false positions or "spoofing".

The estimated propagation delays and Doppler shifts can be determined, for example from the fitting functions by:

$$T_D = f(\theta_i, \phi_i, t_i) - T_O^i \quad (20)$$

and $$D = g(\theta_i, \phi_i, t_i) - D_O^i \quad (21)$$

for a ship with time and Doppler offsets $T_O^i$ and $D_O^i$, and reported polar and azimuth angles $\theta_i$ and $\phi_i$; these are the quantities represented by the red dots in FIGS. 8A and 8B.

These equations can also be inverted to obtain the polar and azimuth angles, $\theta$ and $\phi$, corresponding to the measured values of propagation delay and Doppler shift. The values of these angles can be determined implicitly by the equations:

$$T_D^i = f(\theta, \phi, t_i) - T_O^i \quad (22)$$

and $$D_i = g(\theta, \phi, t_i) - D_O^i \quad (23)$$

In general, equations (22) and (23) are non-linear in $\theta$ and $\phi$, but they can nonetheless be solved using iterative methods, such as the Newton-Raphson method, for example using the reported values, $\theta_i$ and $\phi_i$, as a starting point. A transmitter providing anomalous position data can then be flagged if the values of $\theta$ and $\phi$ deduced from the propagation delay and Doppler shift differed significantly from the reported values, $\theta_i$ and $\phi_i$.

Accordingly, the introduction of additional parameters to characterize systematic timing and frequency offsets associated with particular transmitters enables these parameters to be estimated as part of the general fitting procedure. This can reduce the uncertainties associated with particular transmitters, and significantly increase the accuracy of the associated position estimates. As an additional benefit, the estimated offsets provide some characterization of the individual transmitters, which may be used in conjunction with other parameters such as modulation index and training sequence polarity to test for transmitters trying to spoof their identities.

In some alternative embodiments, three parameters could be used to determine satellite location and a further three parameters could be used to determine the velocity, where all of the parameters are functions of time. The time dependences could be parameterized by spline functions, for instance, and the predicted Doppler shifts and time delays could then be expressed in terms of these spline coefficients, and in terms of the message arrival time and the reported latitude and longitude. Fitting functions formulated in this way could then be fitted to the data using a least squares method as described herein, although this would result in a non-linear problem, which is more complicated mathematically, and is subject to additional uncertainties. Accordingly, a representation that uses a linear expansion in terms of standard basis functions, as described herein, is generally preferred. Although the resulting coefficients have no simple relationship to the satellite location and velocity, this is not information that is actually required in the analysis.

In general, the described methods and systems can be performed as post-processing operations on a set of collected AIS message signal data captured by one or more satellites. Typically such operations can be performed on the ground, particularly since accurate satellite references are not required. However, in some cases, some or all of the operations, could also be performed on board one or more satellites.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

I claim:

1. A method for detecting anomalous Automatic Identification System (AIS) message signals in a plurality of AIS message signals received by at least one satellite in space, the method comprising:
    identifying a plurality of message characteristics associated with the plurality of AIS message signals;
    fitting one or more group characterization criteria to the plurality of message characteristics of the plurality of AIS message signals; and
    generating a computed message characteristic for a selected message signal based on the one or more group characterization criteria;
    detecting whether a received message characteristic associated with the selected message signal conforms to the computed message characteristic within a predetermined tolerance.

2. The method of claim 1, wherein the selected message signal is in the plurality of AIS message signals.

3. The method of claim 1 or claim 2, wherein the one or more group characterization criteria comprise at least one computational function.

4. The method of claim 3, wherein the fitting comprises determining the at least one computational function to be used when fitting to the plurality of message characteristics.

5. The method of claim 4; wherein the at least one computational function comprises a linear combination of spherical harmonics.

6. The method of any one of claims 1 to 5, further comprising:
    identifying a plurality of AIS message signals from a selected AIS transmitter in the plurality of AIS message signals;
    determining at least one transmitter characteristic based on the plurality of AIS message signals from the selected AIS transmitter; and
    using the at least one transmitter characteristic to refine the estimates of other message characteristics associated with the selected AIS transmitter.

7. The method of claim 6, wherein the at least one transmitter characteristic comprises a transmitter timing offset.

8. The method of claim 6 or claim 7, wherein the at least one transmitter characteristic comprises a frequency offset.

9. The method of any one of claims 1 to 8, wherein the computed message characteristic comprises Doppler shift.

10. The method of any one of claims 1 to 8, wherein the computed message characteristic comprises propagation delay.

11. The method of any one of claims 1 to 8, wherein the computed message characteristic comprises a position of the AIS transmitter.

12. The method of any one of claims 1 to 11, wherein the computed message characteristic comprises at least one characteristic selecting from the group consisting of: amplitude of the message signal and polarization of the message signal.

13. An apparatus for detecting anomalous Automatic Identification System (AIS) message signals in a plurality of AIS message signals received by at least one satellite in space, the apparatus comprising:
a memory, the memory storing the plurality of AIS message signals;
a processor, the processor configured to:
identify a plurality of message characteristics associated with the plurality of AIS message signals;
fit one or more group characterization criteria to the plurality of message characteristics of the plurality of AIS message signals; and
generate a computed message characteristic for a selected message signal based on the one or more group characterization criteria;
detect whether a received message characteristic associated with the selected message signal conforms to the computed message characteristic within a predetermined tolerance.

14. The apparatus of claim 13, wherein the selected message signal is in the plurality of AIS message signals.

15. The apparatus of claim 13 or claim 14, wherein the one or more group characterization criteria comprise at least one computational function.

16. The apparatus of claim 15, wherein fitting the one or more group characterization criteria comprises determining the at least one computational function to be used when fitting to the plurality of message characteristics.

17. The apparatus of claim 16; wherein the at least one computational function comprises a linear combination of spherical harmonics.

18. The apparatus of any one of claims 13 to 17, wherein the processor is further configured to:
identify a plurality of AIS message signals from a selected AIS transmitter in the plurality of AIS message signals;
determine at least one transmitter characteristic based on the plurality of AIS message signals from the selected AIS transmitter; and
use the at least one transmitter characteristic to refine the estimates of other message characteristics associated with the selected AIS transmitter.

19. The apparatus of claim 18, wherein the at least one transmitter characteristic comprises a transmitter timing offset.

20. The apparatus of claim 18 or claim 19, wherein the at least one transmitter characteristic comprises a frequency offset.

21. The apparatus of any one of claims 13 to 20, wherein the computed message characteristic comprises Doppler shift.

22. The apparatus of any one of claims 13 to 20, wherein the computed message characteristic comprises propagation delay.

23. The apparatus of any one of claims 13 to 20, wherein the computed message characteristic comprises a position of the AIS transmitter.

24. The apparatus of any one of claims 13 to 23, wherein the computed message characteristic comprises at least one characteristic selecting from the group consisting of: amplitude of the message signal and polarization of the message signal.

* * * * *